(12) United States Patent
Bang et al.

(10) Patent No.: US 12,035,024 B2
(45) Date of Patent: Jul. 9, 2024

(54) CAMERA MODULE HAVING DRIVING PART

(71) Applicant: LG INNOTEK CO., LTD., Seoul (KR)

(72) Inventors: Jung Hwan Bang, Seoul (KR); Jung In Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 83 days.

(21) Appl. No.: 17/604,117

(22) PCT Filed: Apr. 17, 2020

(86) PCT No.: PCT/KR2020/005177
§ 371 (c)(1),
(2) Date: Oct. 15, 2021

(87) PCT Pub. No.: WO2020/213994
PCT Pub. Date: Oct. 22, 2020

(65) Prior Publication Data
US 2022/0210296 A1      Jun. 30, 2022

(30) Foreign Application Priority Data

Apr. 17, 2019  (KR) .......................... 10-2019-0045083

(51) Int. Cl.
*H04N 23/54*  (2023.01)
*G03B 13/36*  (2021.01)
(Continued)

(52) U.S. Cl.
CPC ............. *H04N 23/54* (2023.01); *G03B 13/36* (2013.01); *G03B 17/12* (2013.01); *H04N 23/687* (2023.01)

(58) Field of Classification Search
CPC ...... H04N 23/54; H04N 23/687; H04N 23/55; H04N 23/57; H04N 23/6812;
(Continued)

(56) References Cited

U.S. PATENT DOCUMENTS 10,429,608 B1 * 10/2019 Baer ..................... G02B 7/285
10,816,756 B2    10/2020 Lee et al.
(Continued)

FOREIGN PATENT DOCUMENTS

CN       107615160 A     1/2018
CN       108351484 A     7/2018
(Continued)

OTHER PUBLICATIONS

International Search Report, issued in PCT/KR2020/005177, dated Jul. 23, 2020.

*Primary Examiner* — Padma Haliyur
(74) *Attorney, Agent, or Firm* — Birch, Stewart, Kolasch & Birch, LLP

(57) ABSTRACT

A camera module according to an embodiment may include a first circuit board on which the image sensor is disposed; a base disposed on the first circuit board; a lens assembly disposed within the base; and a third circuit board disposed on one side of the base, on which a coil part constituting the lens assembly and a driving device for controlling driving of the coil part are disposed, wherein the driving device comprises: a coil driver configured to apply a current to the coil, and a Hall sensor configured to sense a position of the lens assembly.

20 Claims, 30 Drawing Sheets

(51) Int. Cl.
*G03B 17/12* (2021.01)
*H04N 23/68* (2023.01)

(58) Field of Classification Search
CPC ...... H04N 23/686; G03B 13/36; G03B 17/12; G03B 3/10; G03B 30/00; G03B 2205/0069; G03B 5/00; G03B 2205/0007
See application file for complete search history.

(56) References Cited

U.S. PATENT DOCUMENTS

| | | | |
|---|---|---|---|
| 11,409,073 | B2 | 8/2022 | Lee et al. |
| 2017/0214831 | A1 | 7/2017 | Ha et al. |
| 2018/0067379 | A1 | 3/2018 | Rho et al. |
| 2018/0173080 | A1 | 6/2018 | Enta |
| 2018/0275368 | A1* | 9/2018 | Lee .......................... G03B 5/00 |
| 2018/0364450 | A1 | 12/2018 | Lee et al. |
| 2020/0050014 | A1 | 2/2020 | Park et al. |
| 2020/0177815 | A1* | 6/2020 | Kim .................... H04N 23/6812 |
| 2020/0409033 | A1 | 12/2020 | Lee et al. |
| 2021/0294067 | A1* | 9/2021 | Park ...................... H02K 41/035 |
| 2022/0099919 | A1 | 3/2022 | Lee et al. |

FOREIGN PATENT DOCUMENTS

| | | | | |
|---|---|---|---|---|
| KR | 10-1566299 | B1 | 11/2015 | |
| KR | 10-2018-0002417 | A | 1/2018 | |
| KR | 10-2018-0116965 | A | 10/2018 | |
| KR | 10-2019-0014375 | A | 2/2019 | |
| KR | 10-2019-0023185 | A | 3/2019 | |
| KR | 10-2072811 | B1 | 3/2020 | |
| TW | 201905587 | A | 2/2019 | |
| WO | WO-2017043849 | A1 * | 3/2017 | ........... G02B 27/646 |
| WO | WO-2018062809 | A1 * | 4/2018 | ........... G02B 27/646 |

* cited by examiner

[FIG. 1]
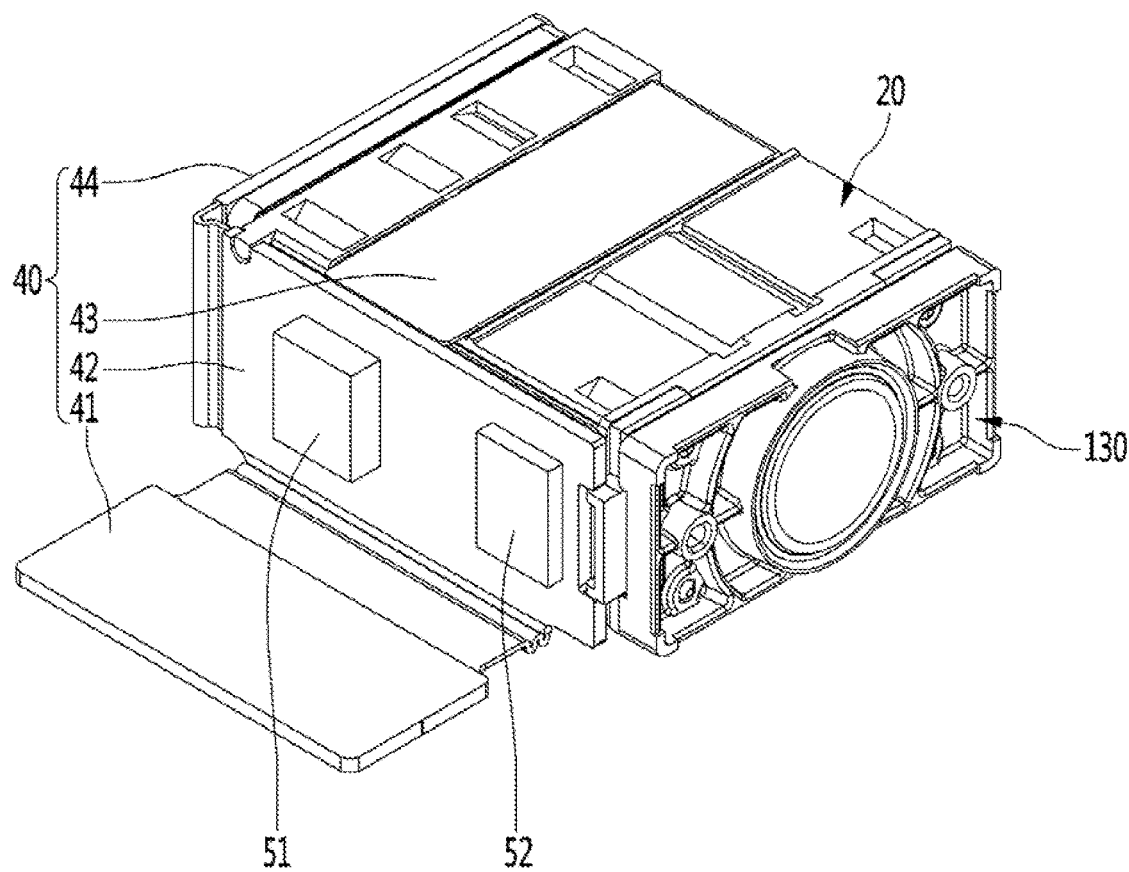
[FIG. 2]
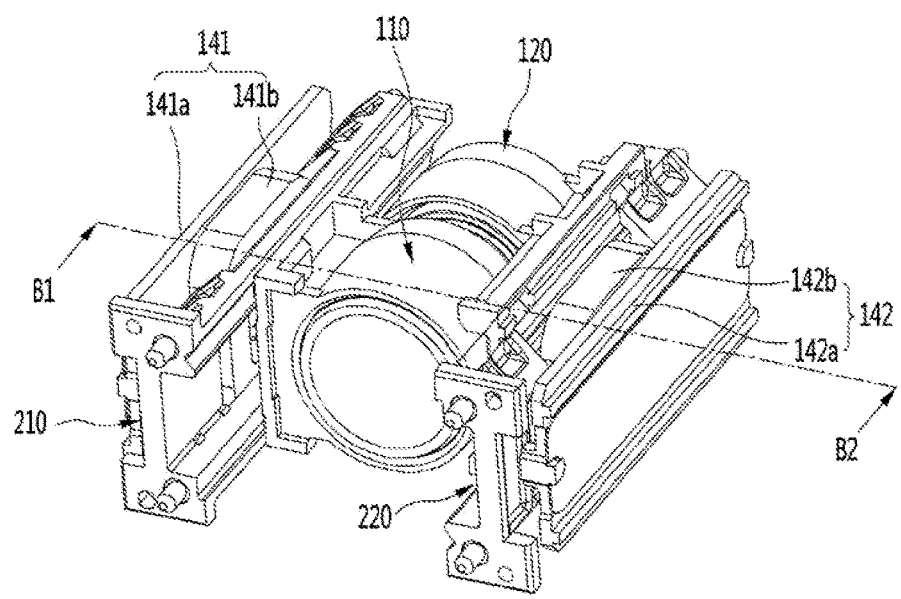

[FIG. 3]
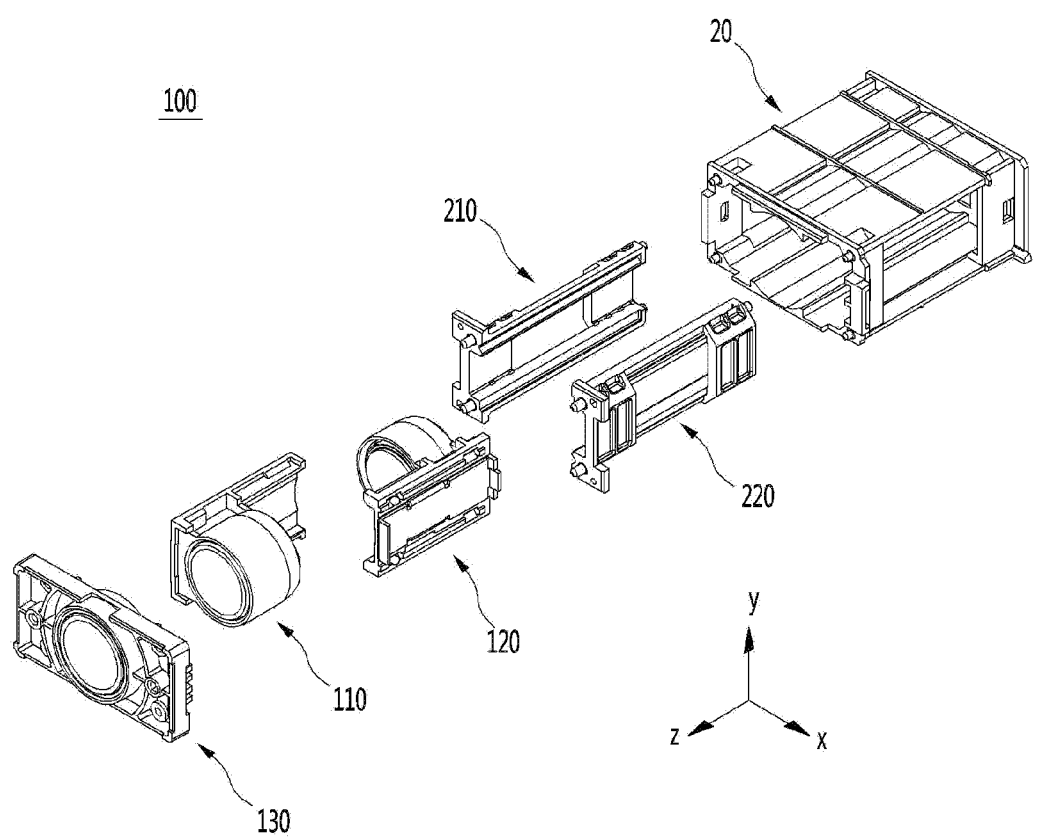

[FIG. 4]
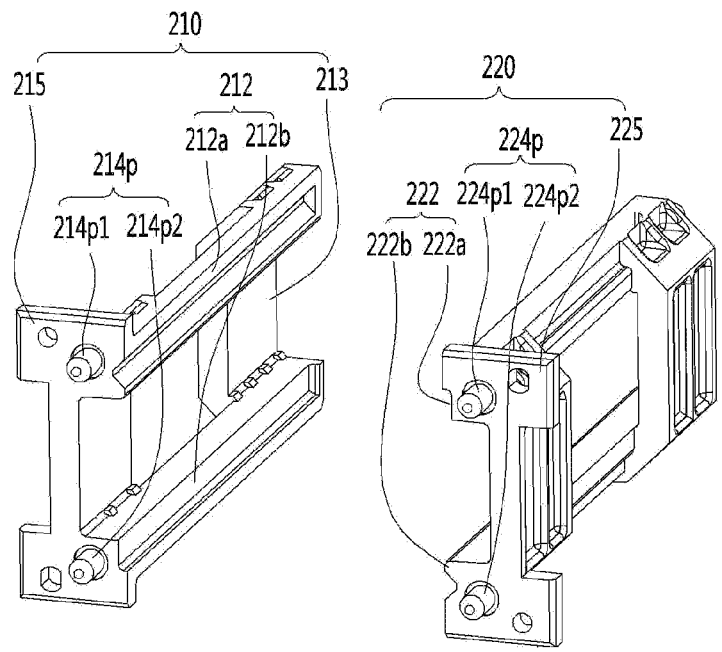
[FIG. 5]
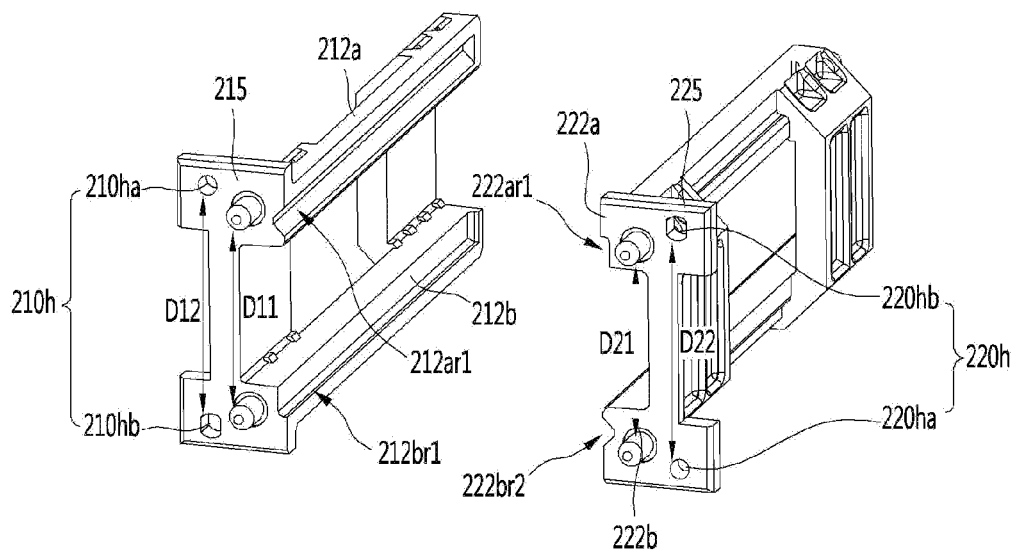

【FIG. 6a】
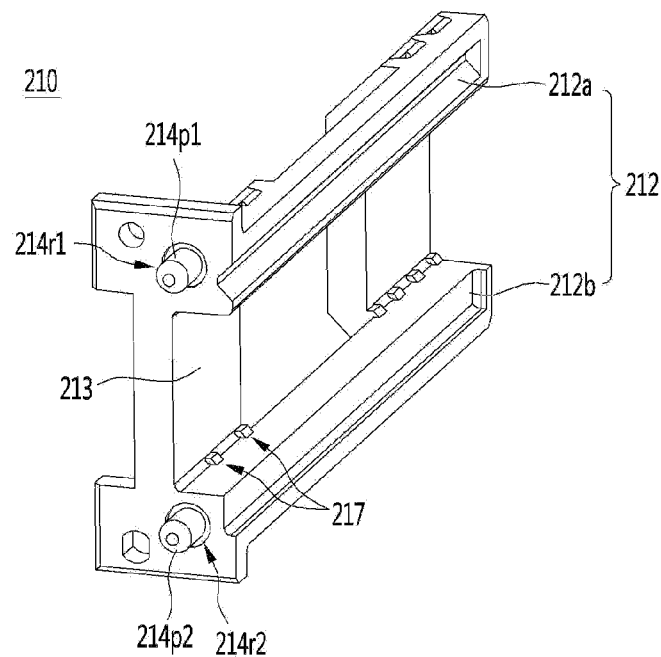
【FIG. 6b】
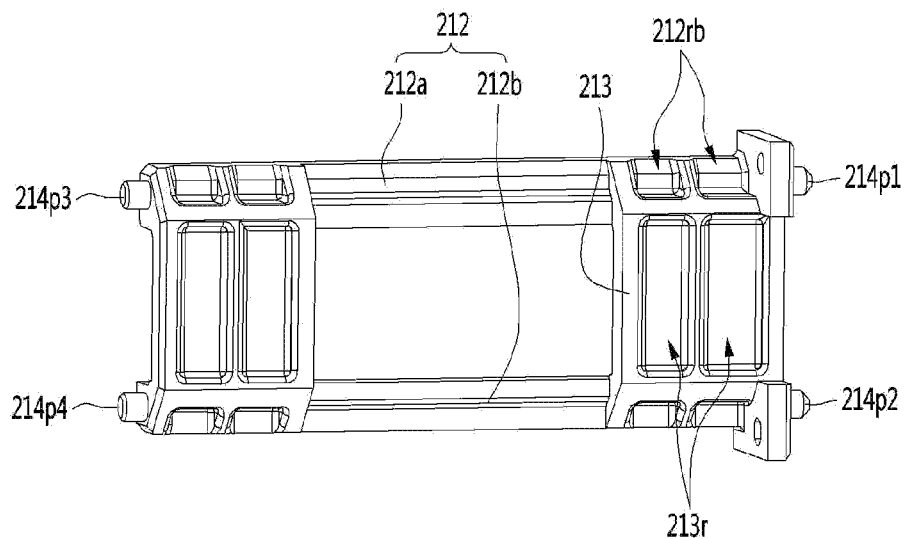

【FIG. 7a】
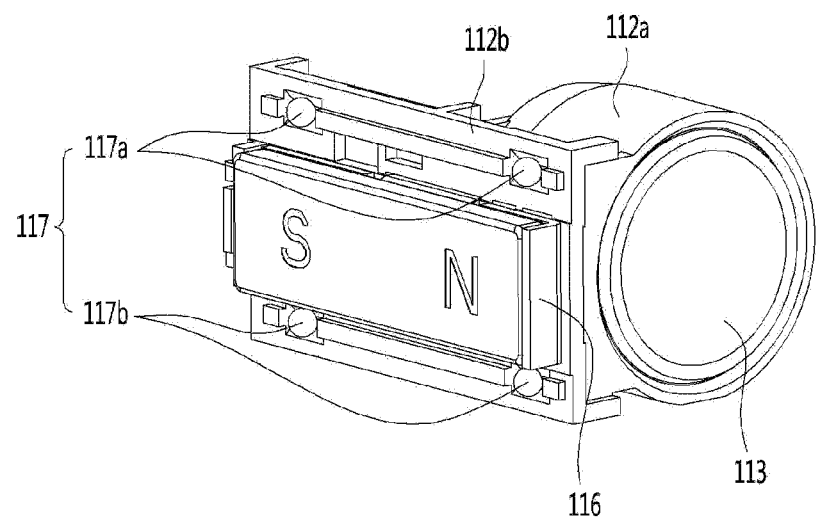
【FIG. 7b】
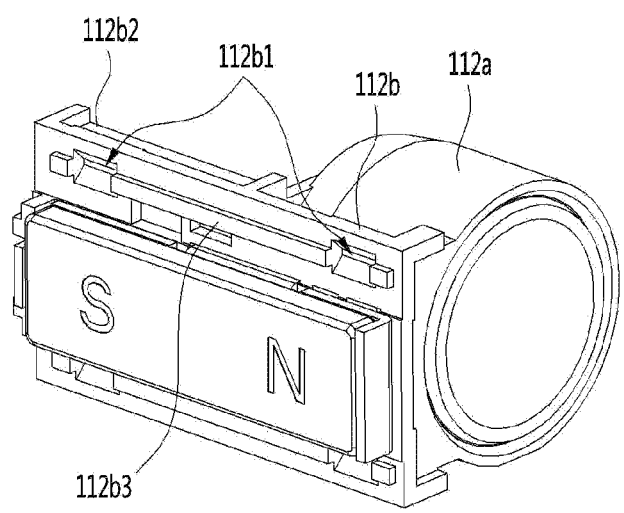

【FIG. 8a】
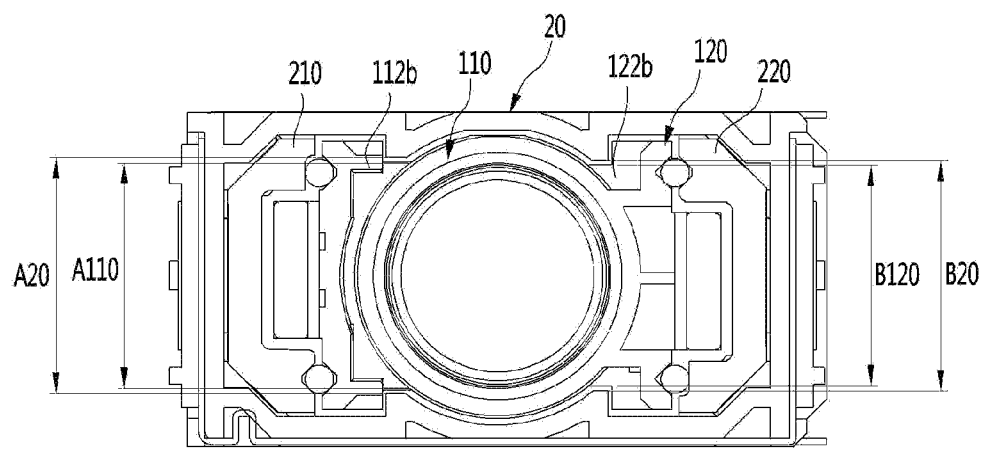
【FIG. 8b】
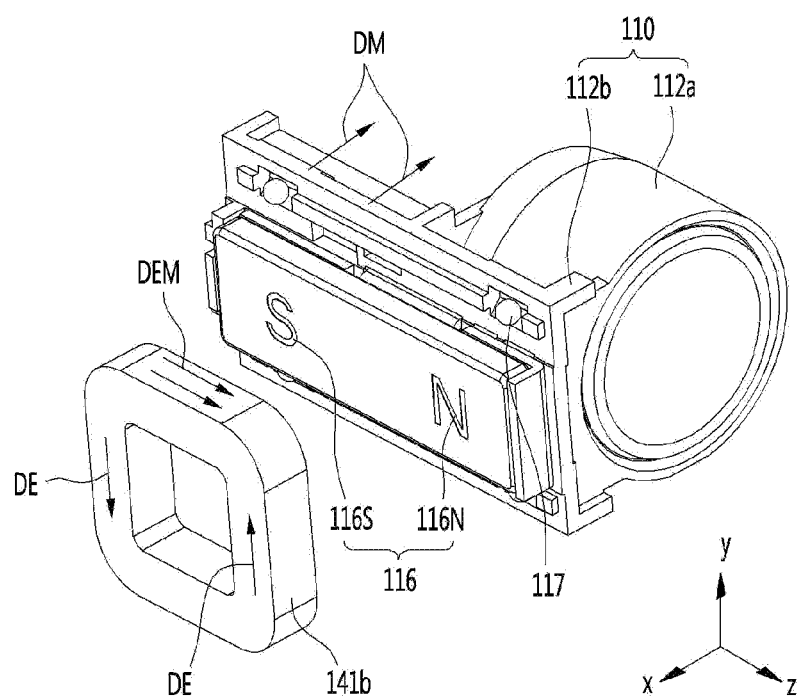

[FIG. 9]
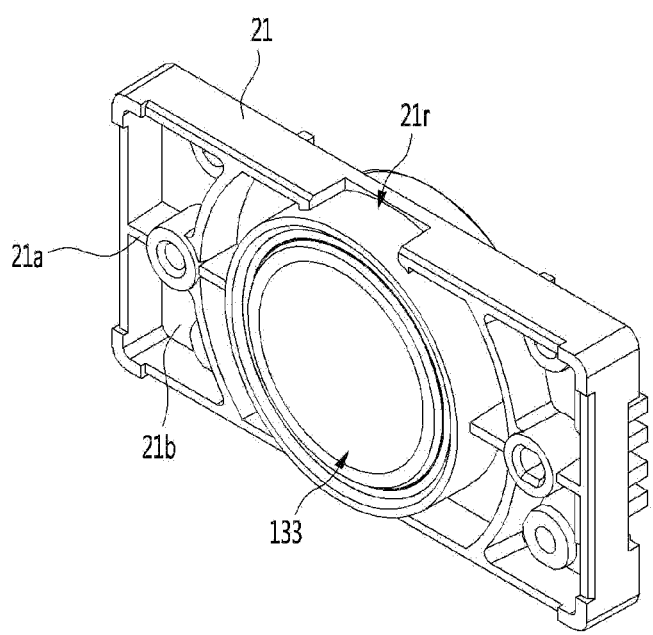

[FIG. 10]
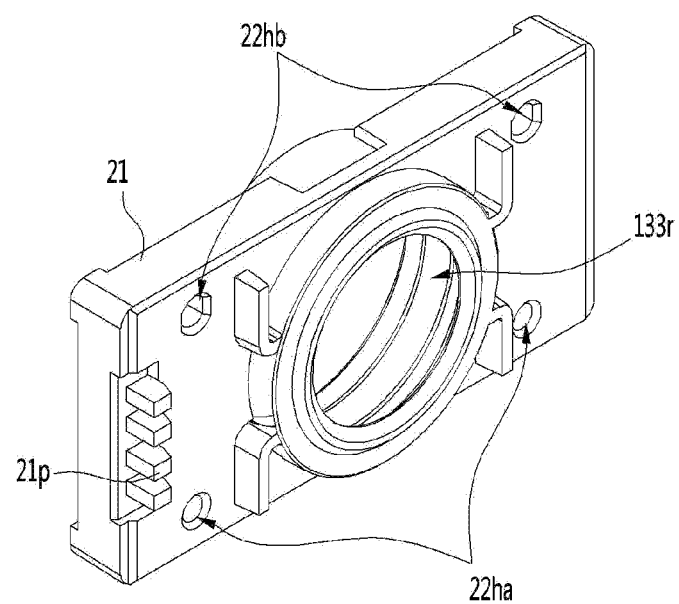

[FIG. 11a]
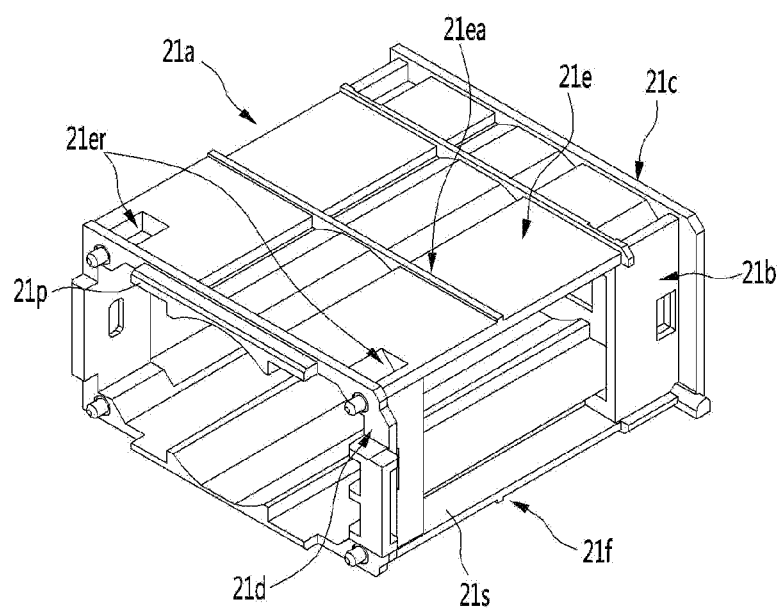
[FIG. 11b]
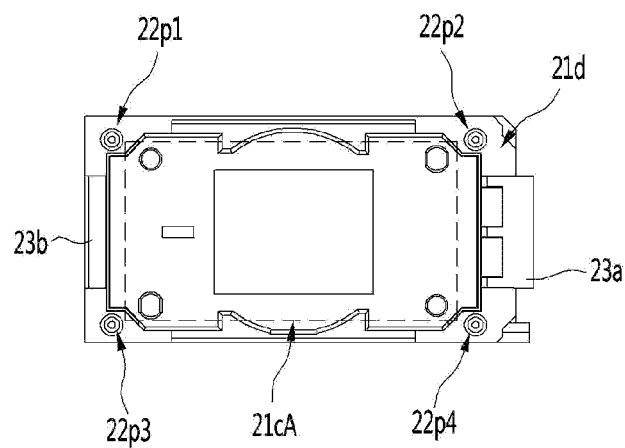

【FIG. 12】
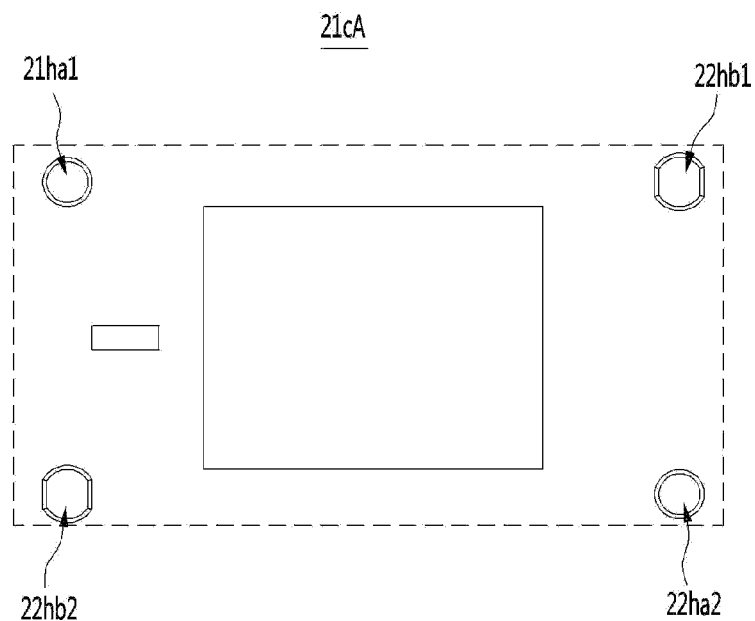
【FIG. 13】
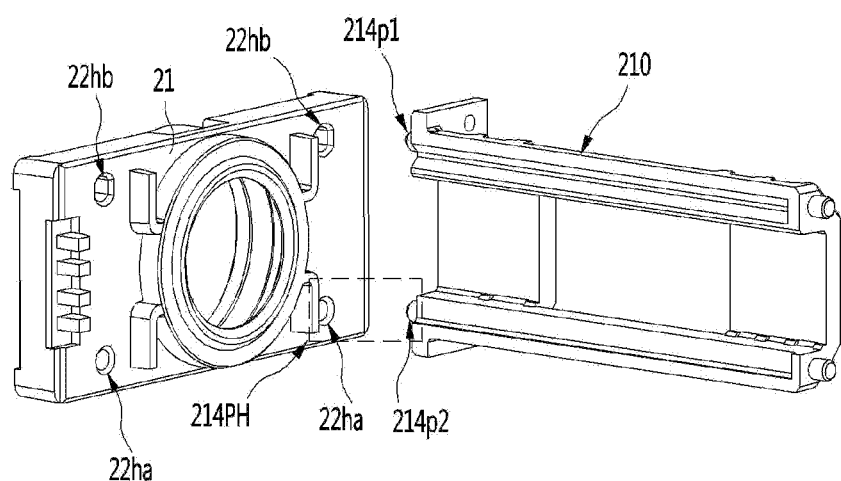

[FIG. 14]
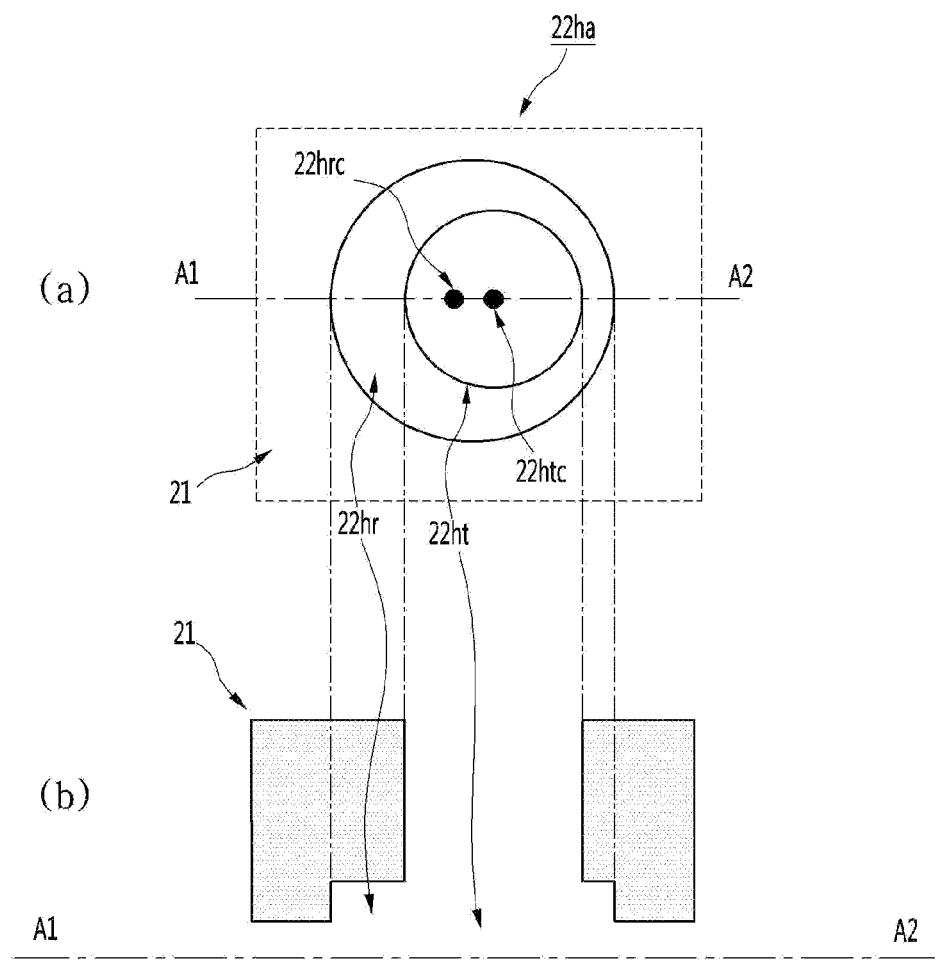

[FIG. 15]
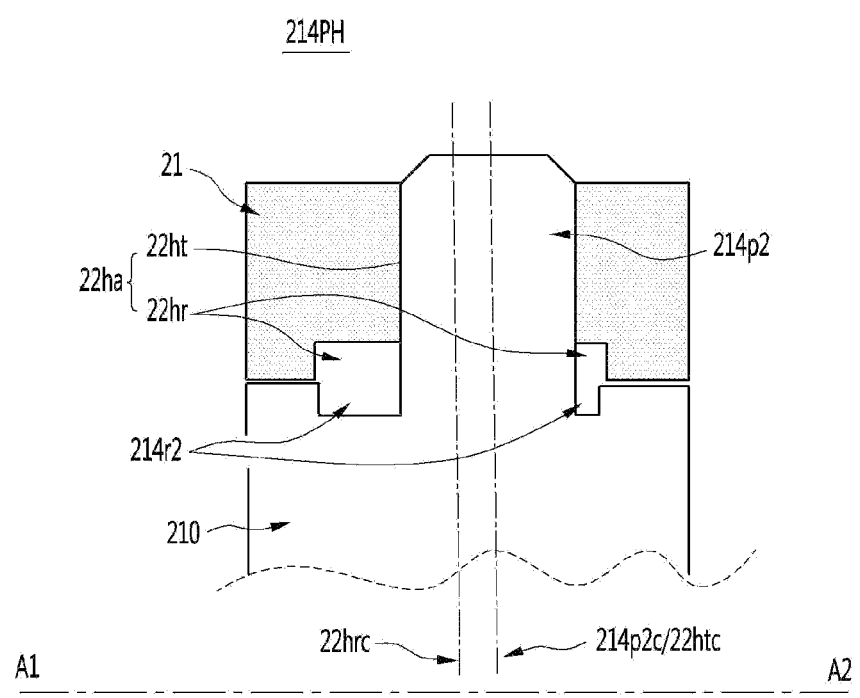

[FIG. 16]
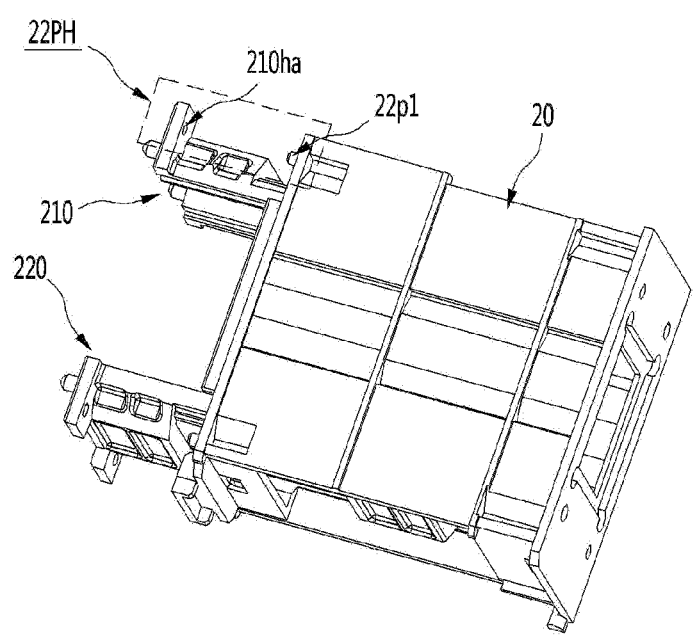

[FIG. 17]
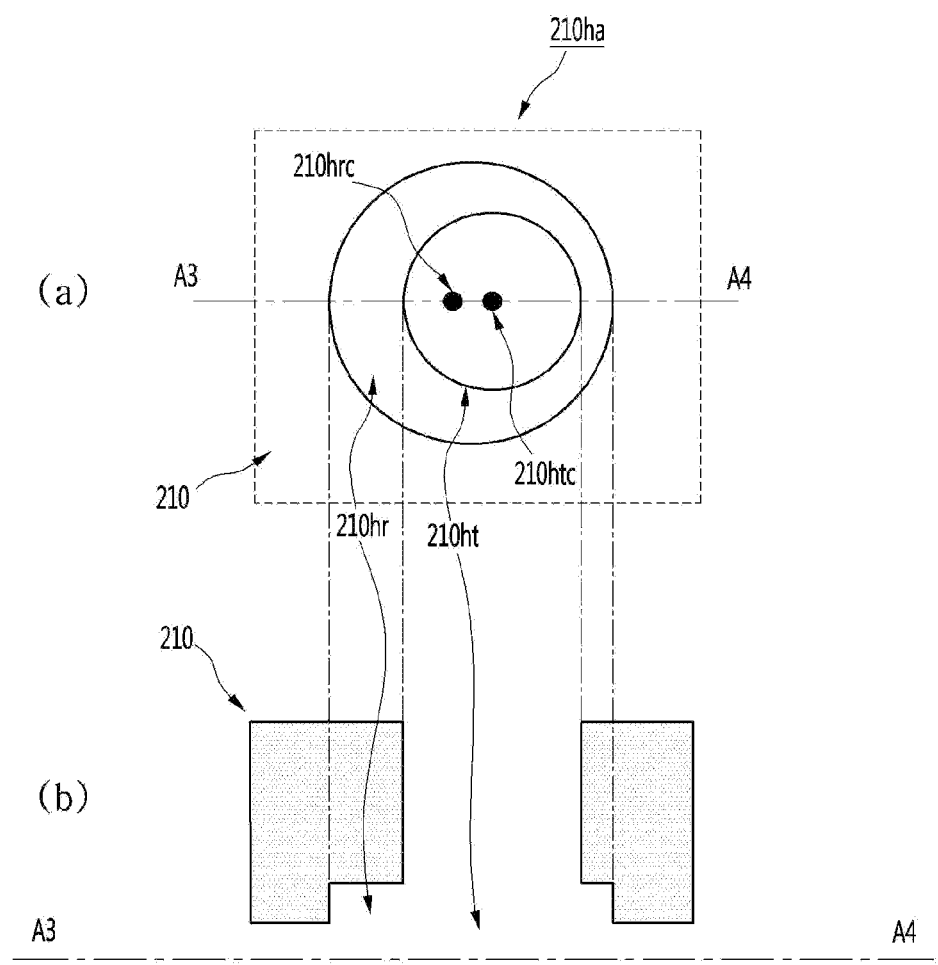

[FIG. 18]
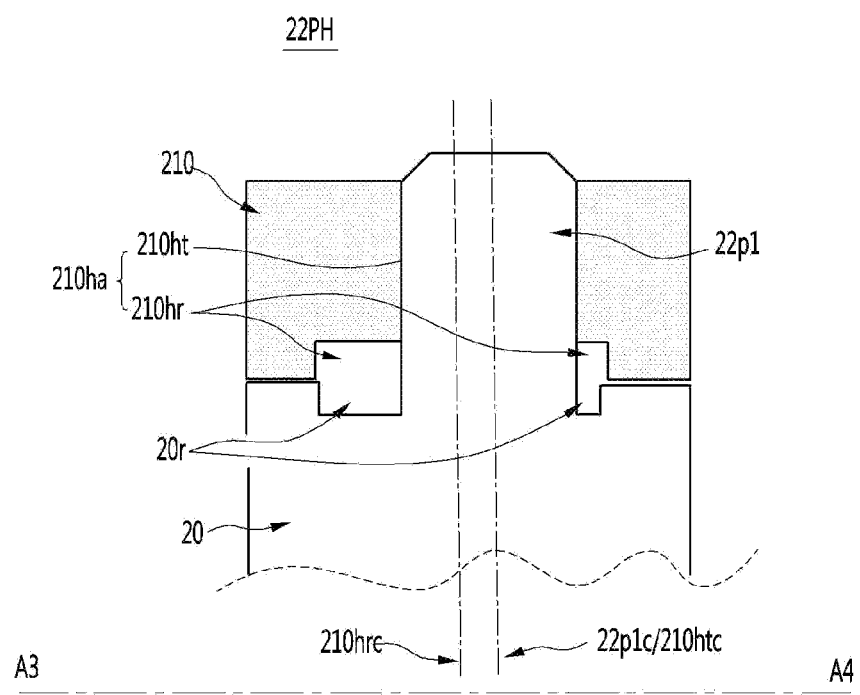

【FIG. 19a】
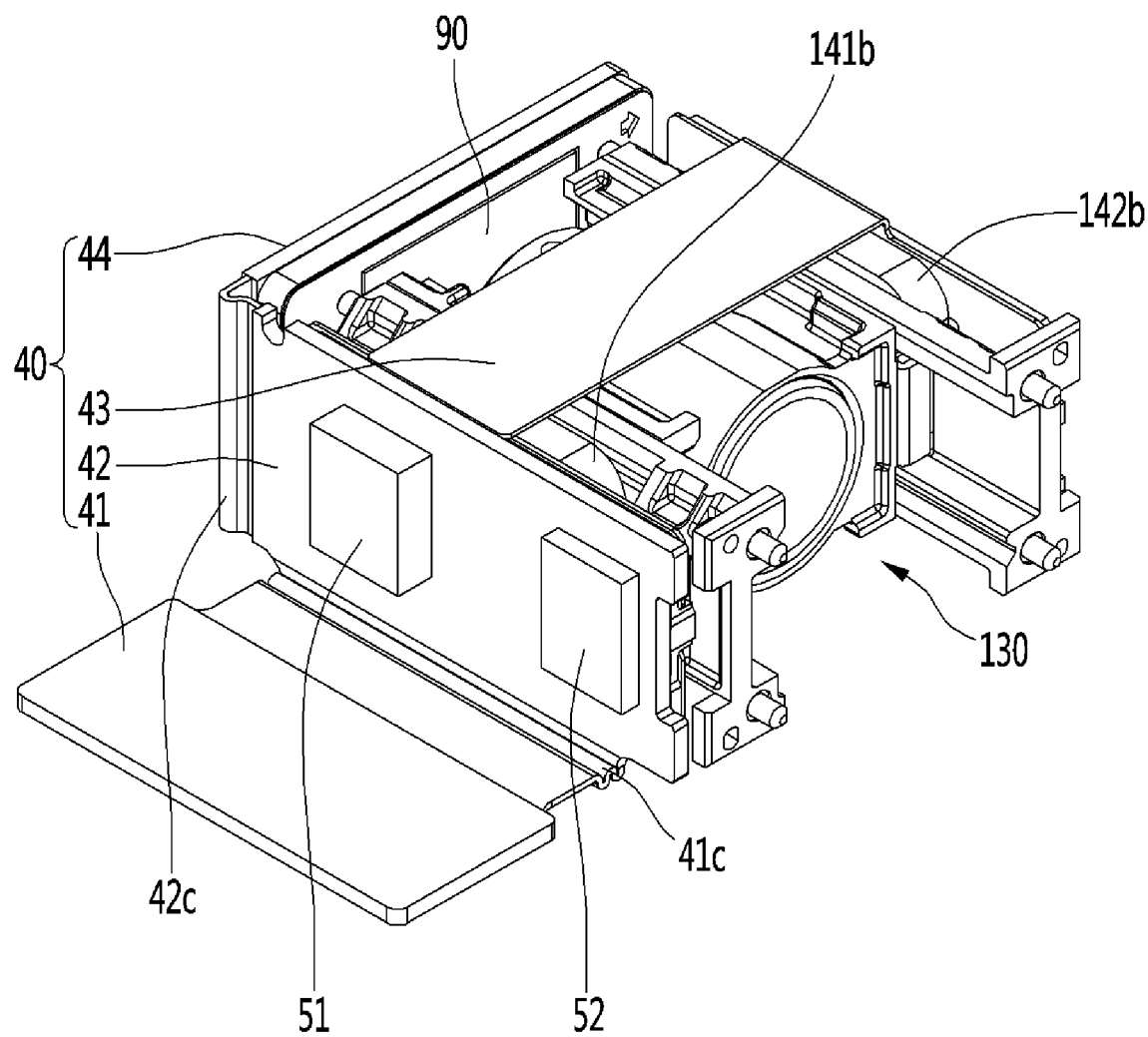

【FIG. 19b】
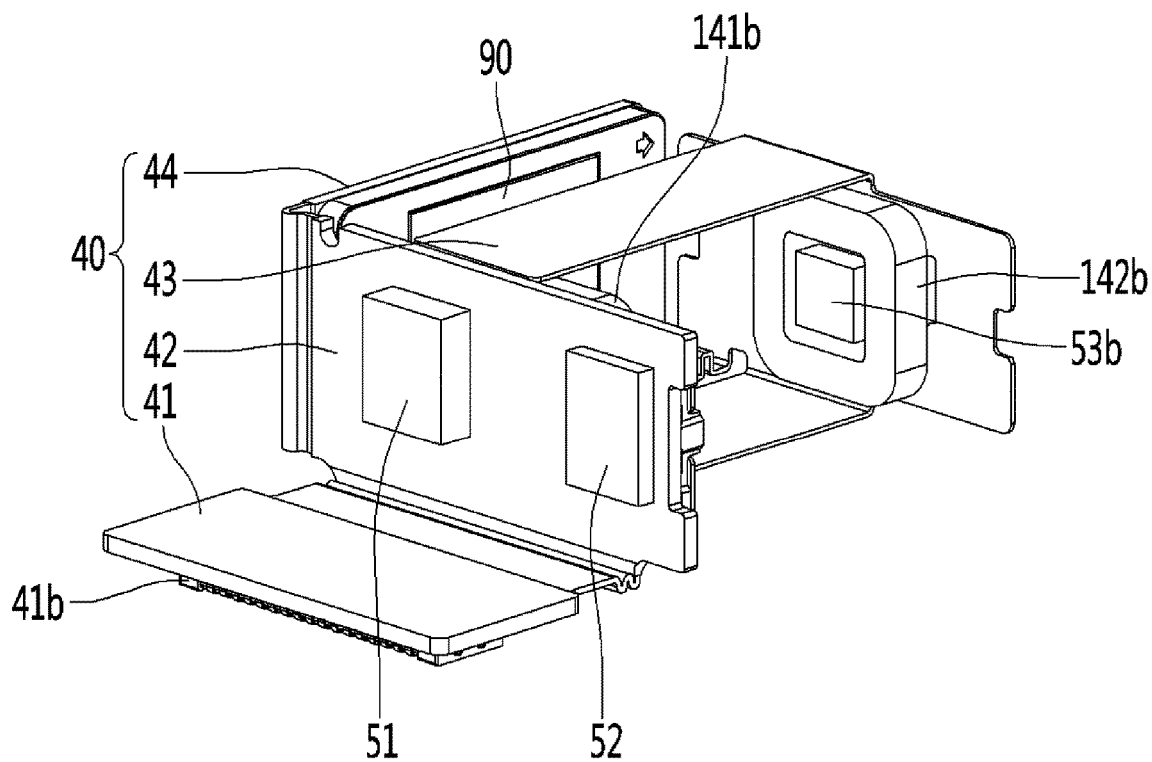
【FIG. 19c】
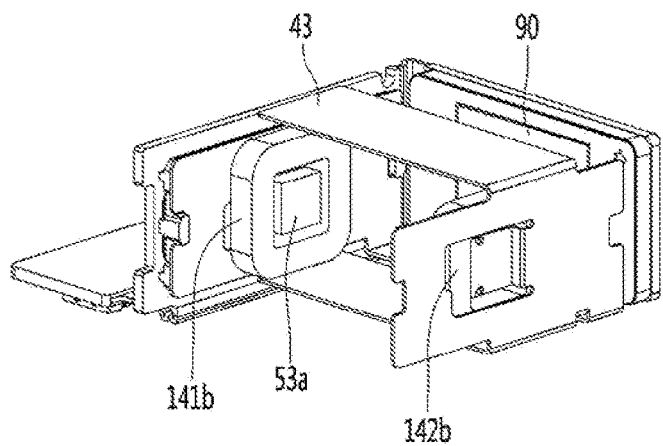

[FIG. 19d]
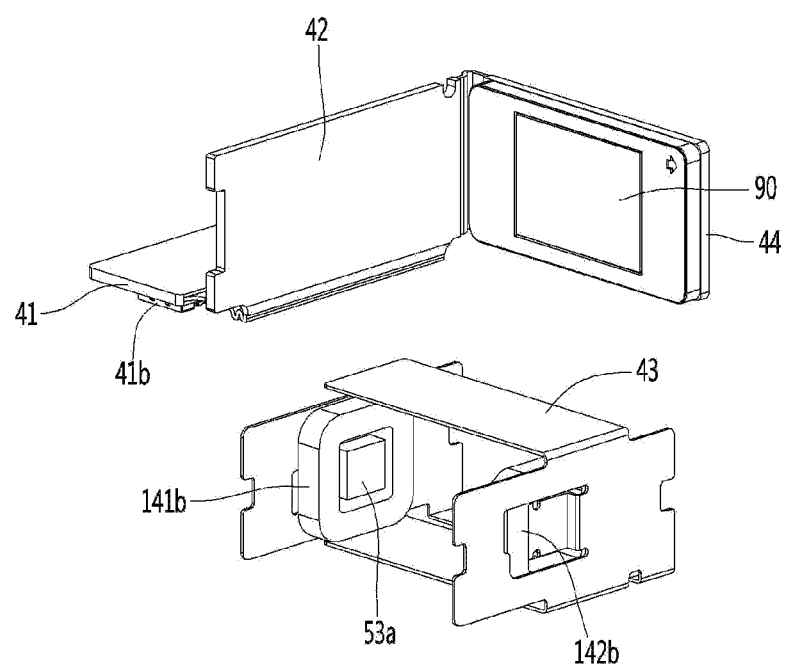

[FIG. 19e]
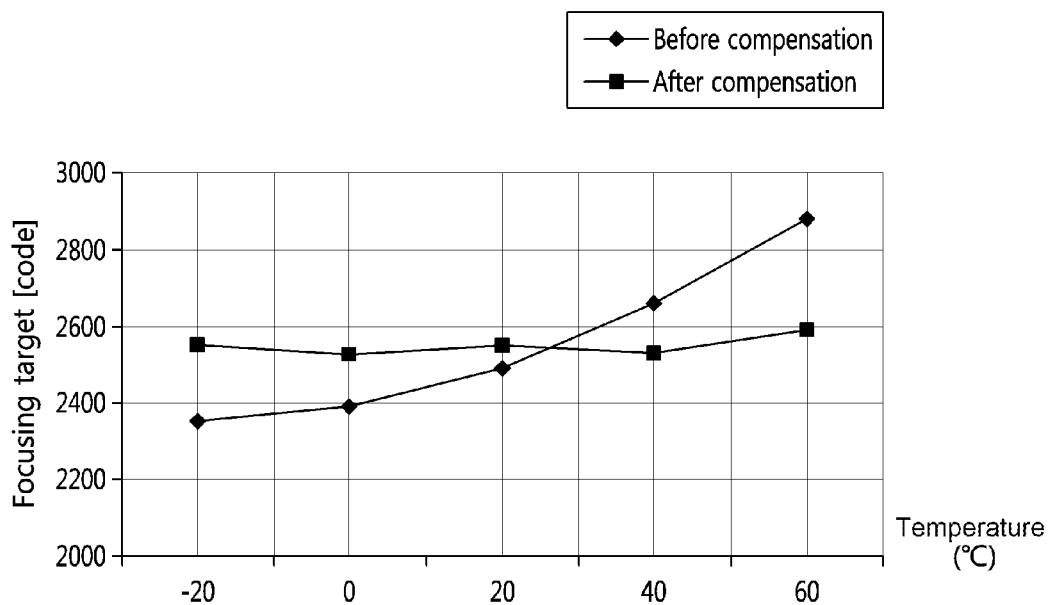
[FIG. 20]
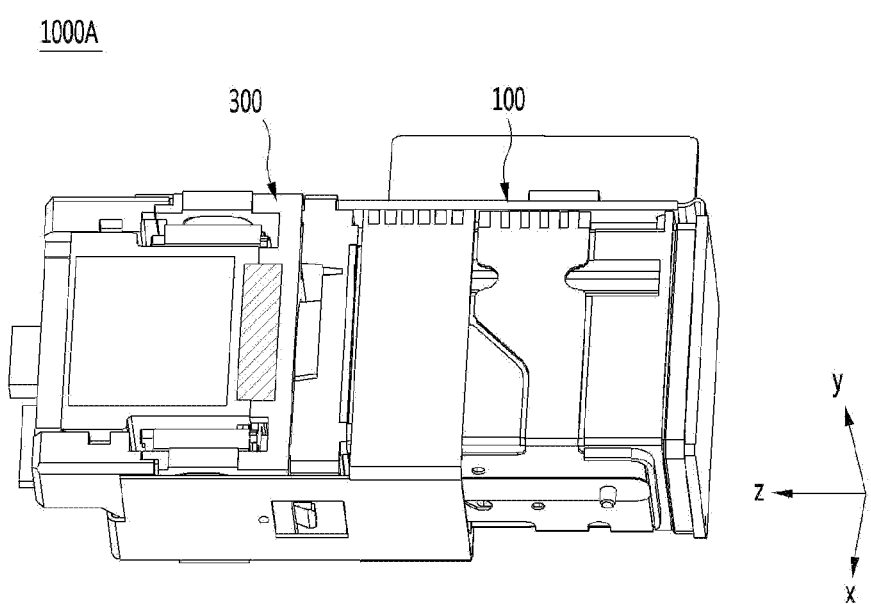

【FIG. 21a】
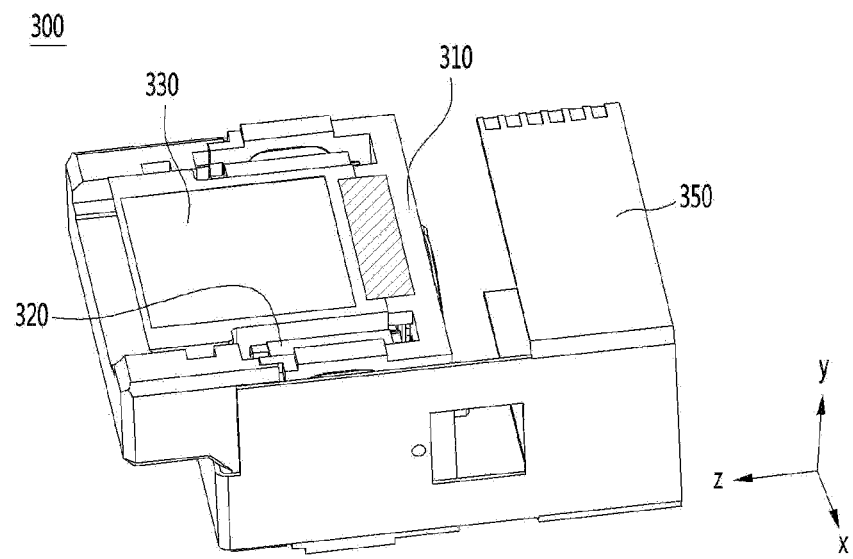
【FIG. 21b】
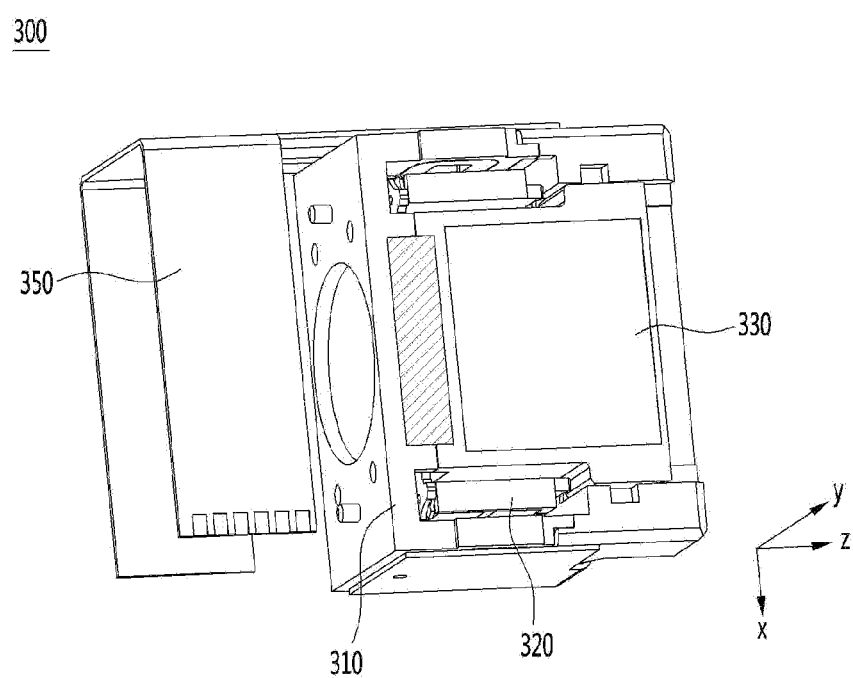

【FIG. 22a】
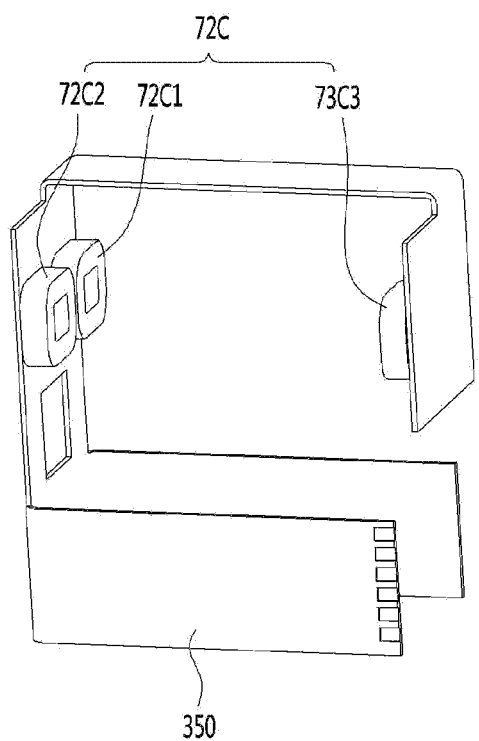

【FIG. 22b】
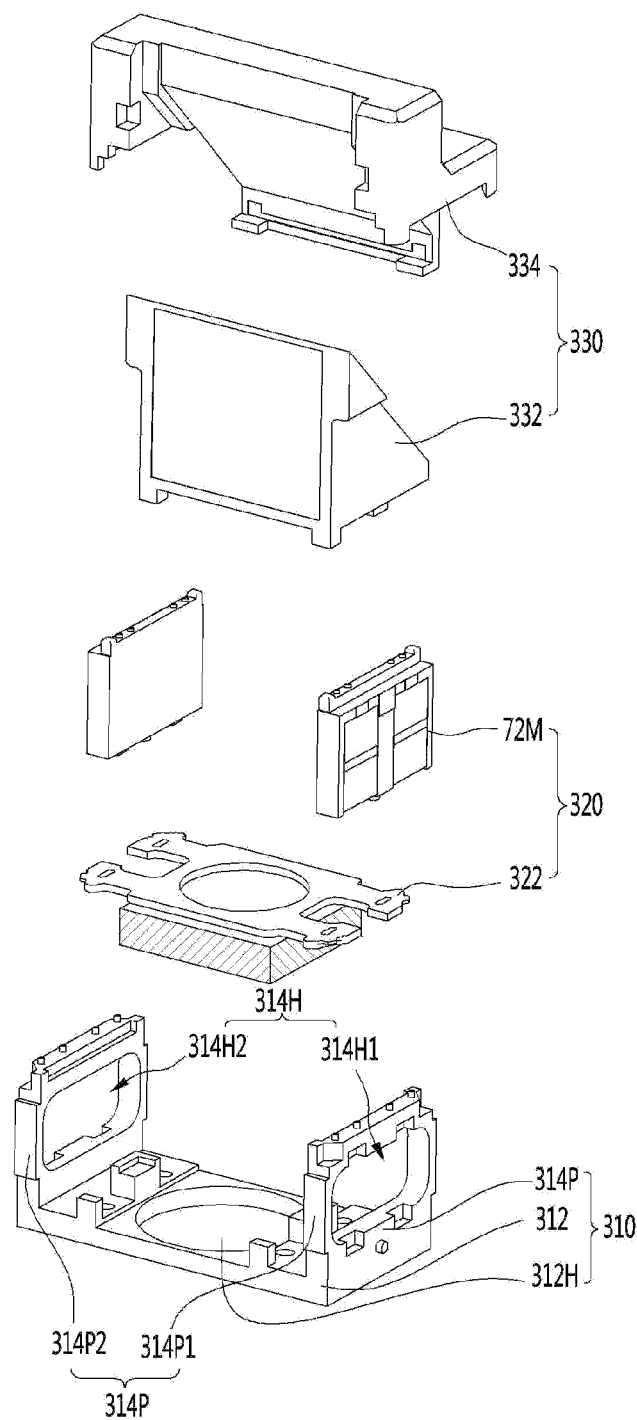

[FIG. 22c]
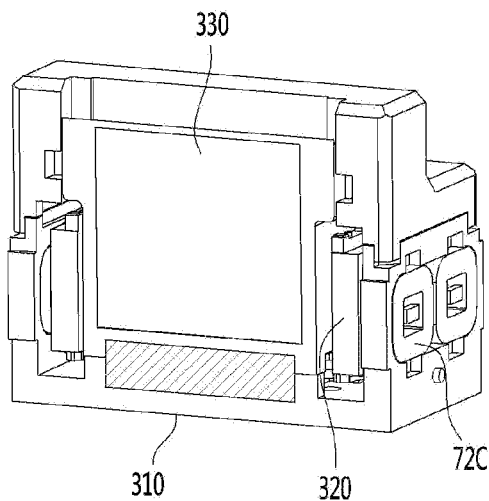
[FIG. 23a]
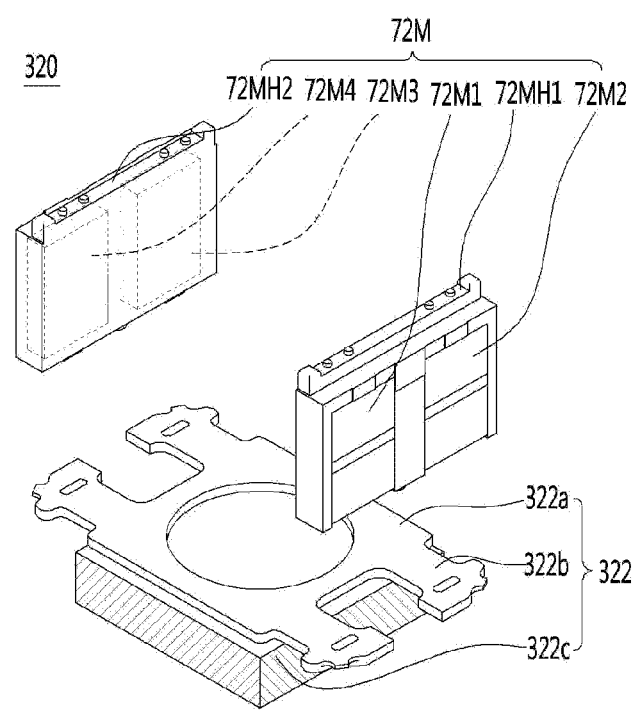

【FIG. 23b】
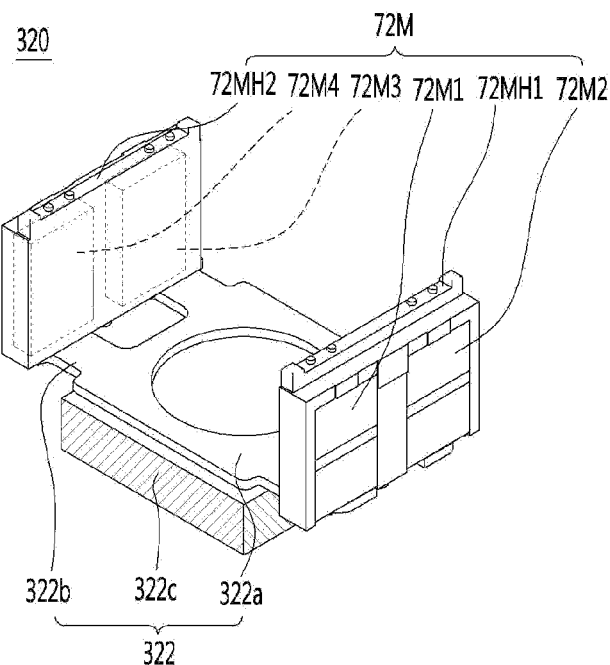
【FIG. 23c】
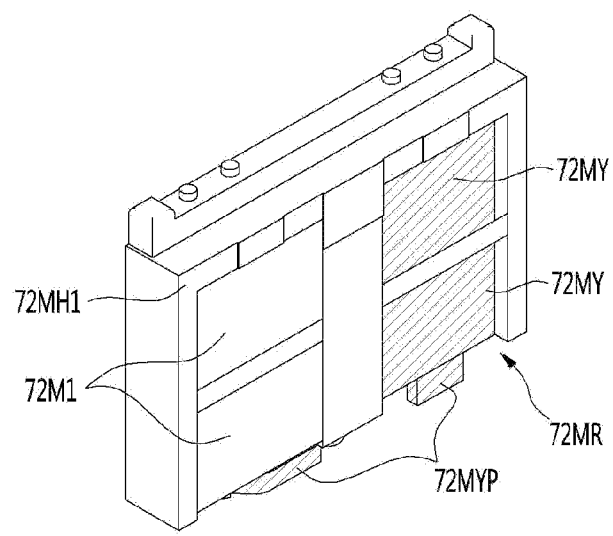

【FIG. 24】
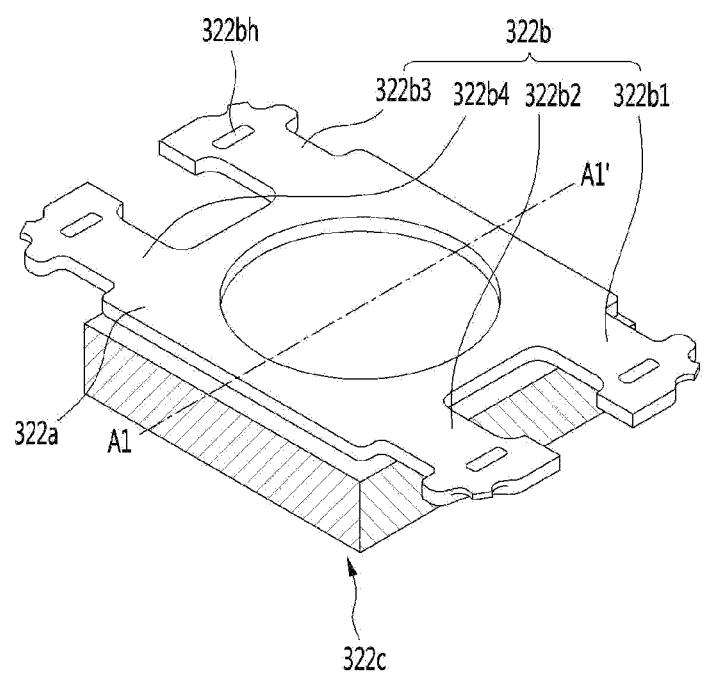
【FIG. 25】
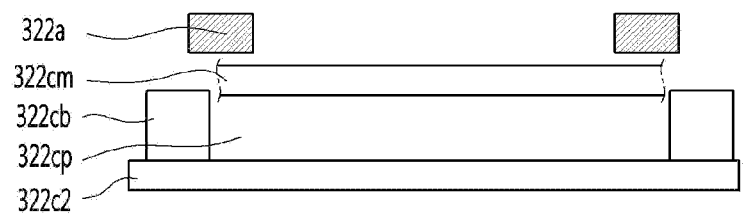

[FIG. 26a]
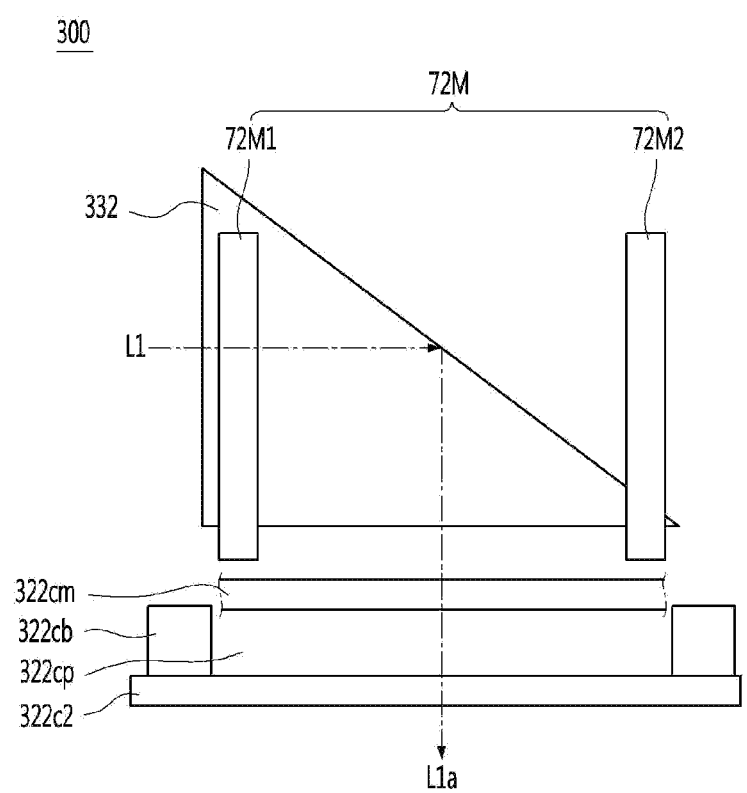

[FIG. 26b]
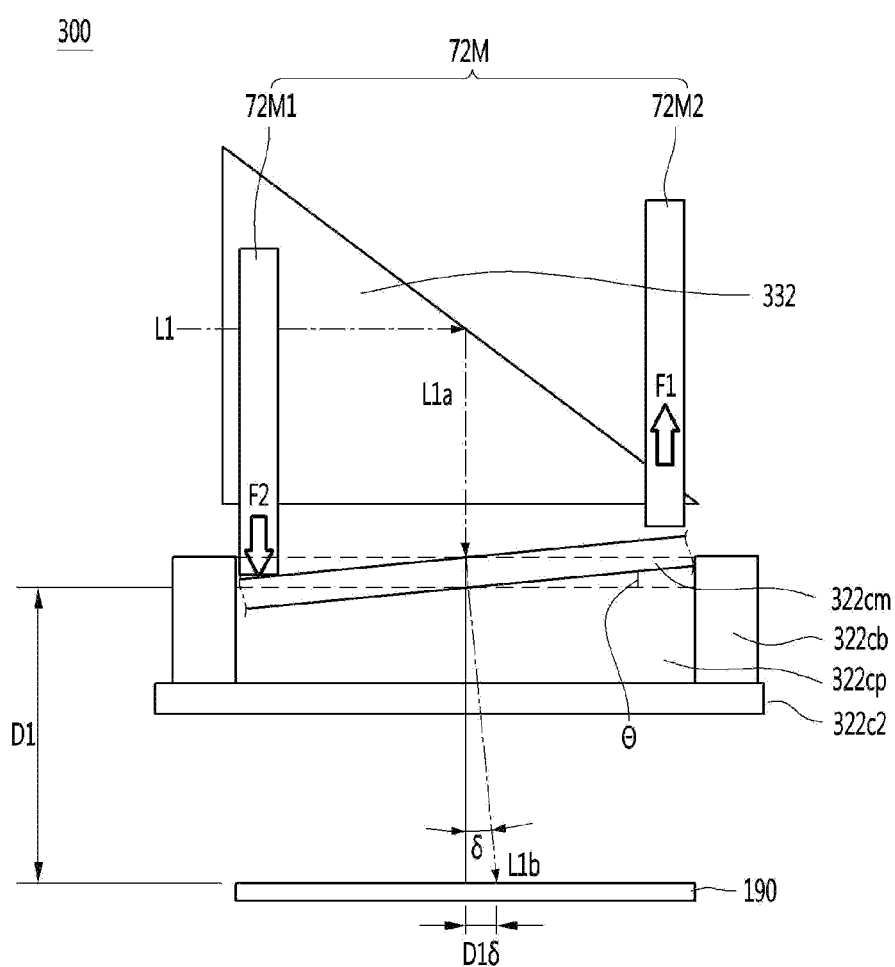

【FIG. 27】
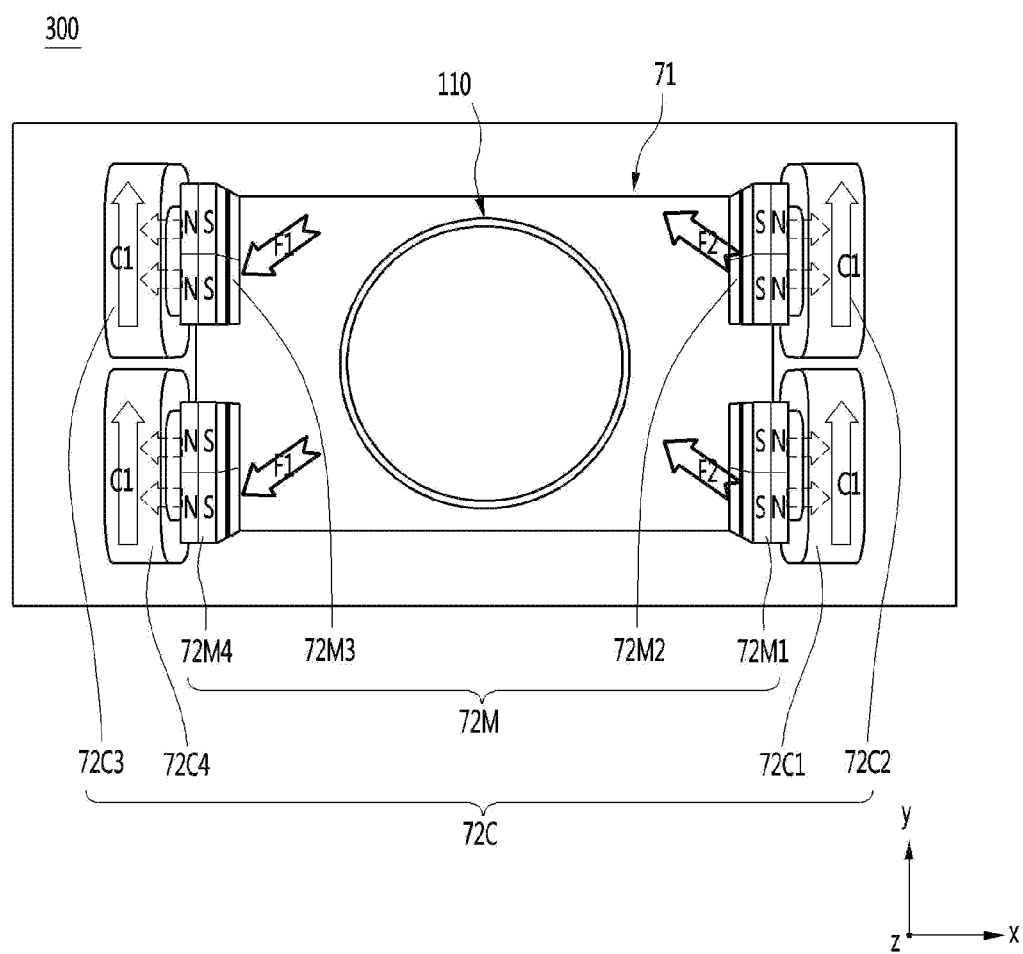

[FIG. 28]
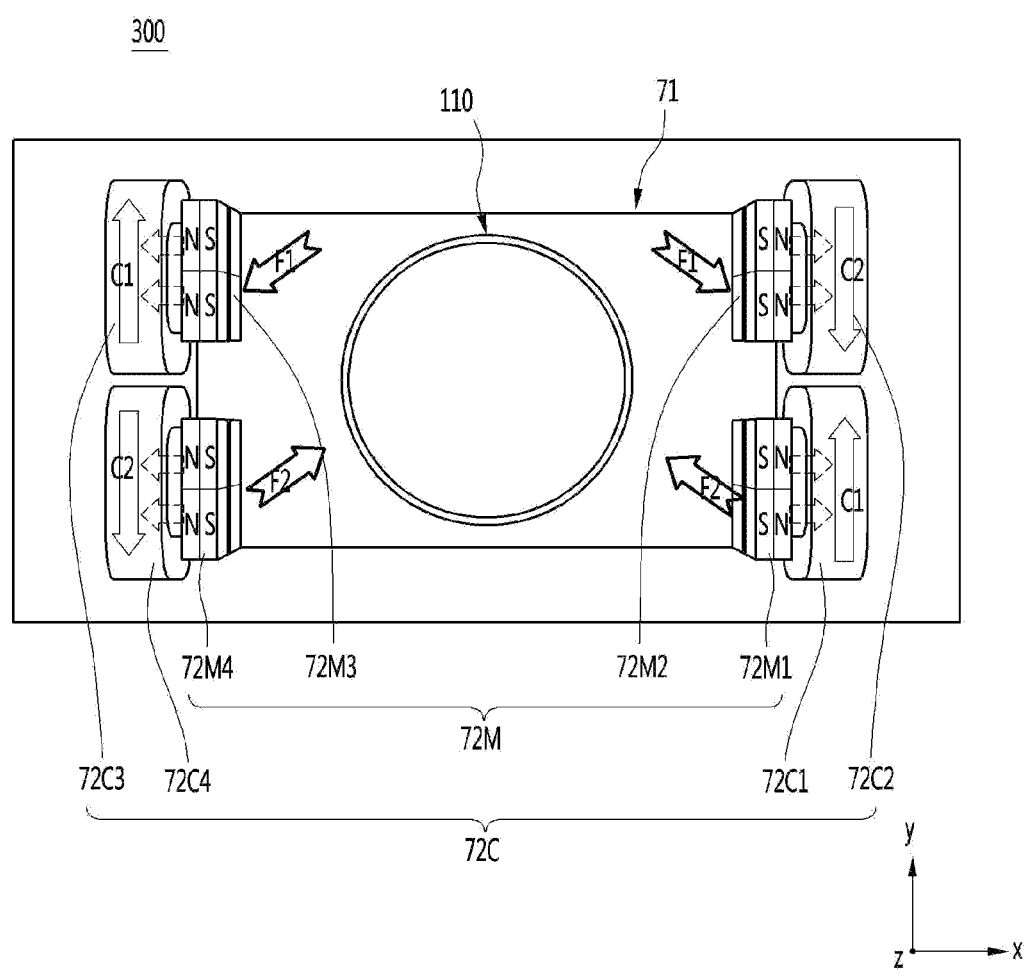

[FIG. 29]
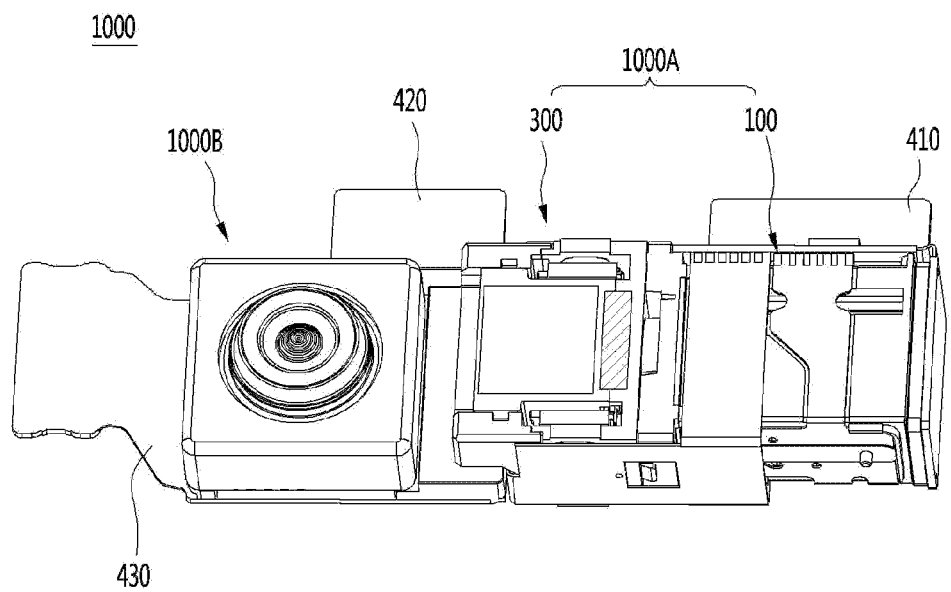
[FIG. 30]
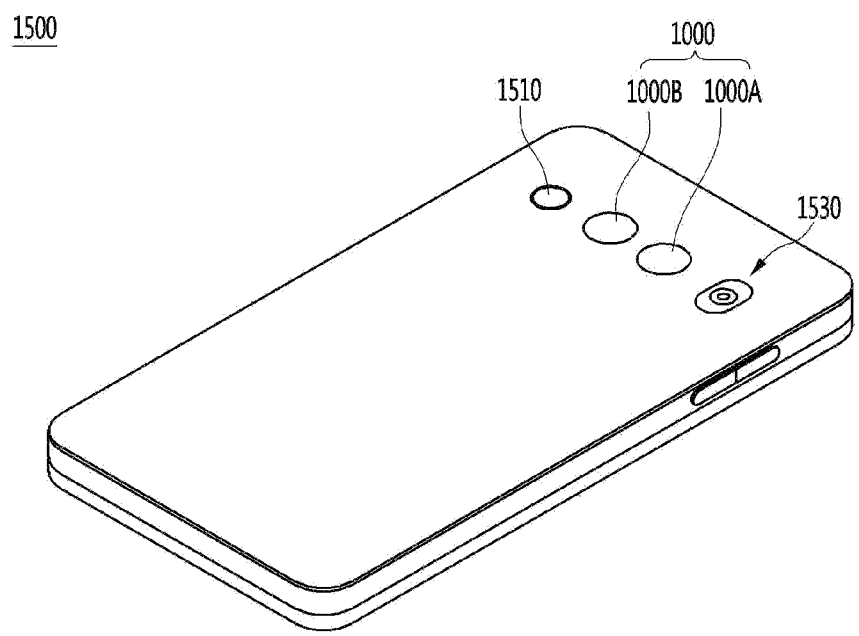

CAMERA MODULE HAVING DRIVING PART

CROSS REFERENCE TO RELATED APPLICATIONS

This application is the National Phase of PCT International Application No. PCT/KR2020/005177, filed on Apr. 17, 2020, which claims priority under 35 U.S.C. 119(a) to Patent Application No. 10-2019-0045083, filed in the Republic of Korea on Apr. 17, 2019, all of which are hereby expressly incorporated by reference into the present application.

TECHNICAL FIELD

An embodiment relates to a camera module.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF) function adjusting automatically a distance between an image sensor and a lens to adjust a focal length of the lens.

In addition, recently, a camera module may perform a zooming function of zooming up or zooming out photographing a subject by increasing or decreasing a magnification of a long-distance subject through a zoom lens.

Further, recently, a camera module adopts an image stabilization (IS) technology to correct or prevent image shake caused by camera movement due to an unstable fixing device or user movement.

Such an image stabilization (IS) technology includes an optical image stabilizer (OIS) technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

Meanwhile, a zoom actuator is used for a zooming function of a camera module, but frictional torque is generated when a lens is moved by mechanical movement of the actuator, and there are technical problems such as a decrease in driving force, an increase in power consumption, or a deterioration in control characteristics due to the friction torque.

Specifically, in order to achieve the best optical characteristics by using a plurality of zoom lens groups in a camera module, an alignment between the plurality of lens groups and an alignment between the plurality of lens groups and an image sensor should be well matched, but when a decentering in which a spherical center between the lens groups deviates from an optical axis, a tilt which is a phenomenon of lens tilt, or a phenomenon in which central axes of the lens groups and the image sensor are not aligned occurs, an angle of view changes or defocus occurs, which adversely affects image quality or resolution.

Meanwhile, when increasing a separation distance in a region in which friction occurs in order to reduce a friction torque resistance while moving a lens for a zooming function in a camera module, there is a contradiction in technical problems in which a lens decentering or a lens tilt are deepened when zoom movement or reversal of the zoom movement is performed.

Meanwhile, in an image sensor, as a pixel is higher, a resolution increases and a size of the pixel becomes smaller, and when the size of the pixel becomes smaller, an amount of light received at the same time will be reduced. Therefore, in a darker environment, in a high-pixel camera, image shake due to camera shake that occurs while a shutter speed is slower occurs more seriously.

Accordingly, recently, an OIS function has been indispensable for photographing an image without deformation using a high-pixel camera in dark nights or moving images.

Meanwhile, OIS technology is a method to correct image quality by changing an optical path by moving a lens or an image sensor of a camera. In particular, in the OIS technology, movement of the camera is sensed through a gyro sensor, and a distance that the lens or the image sensor should move based on the movement is calculated.

For example, an OIS correction method includes a lens moving method and a module tilting method. In the lens moving method, only a lens in a camera module is moved in order to realign the center of an image sensor and an optical axis. On the other hand, the module tilting method is a method of moving the entire module including the lens and the image sensor.

Specifically, the module tilting method has an advantage that a correction range is wider than that of the lens moving method and a focal length between the lens and the image sensor is fixed, and thus image deformation may be minimized.

Meanwhile, in case of the lens moving method, a hall sensor is used to sense a position and movement of the lens. On the other hand, in the module tilting method, a photo reflector is used to sense movement of the module. However, both methods use a gyro sensor to sense movement of a user of the camera.

An OIS controller uses data recognized by the gyro sensor to predict a position in which the lens or the module should move in order to compensate for movement of a user.

Recently, an ultra-thin and ultra-small camera module is required in accordance with technological trends, but since the ultra-small camera module has a space limitation for OIS drive, there is a problem that it is difficult to implement the OIS function applied to a general large camera, and there is a problem that the ultra-thin and ultra-small camera module cannot be implemented when the OIS drive is applied.

In addition, in the conventional OIS technology, an OIS driver is disposed at a side surface of a solid-state lens assembly within a limited camera module size, and thus there is a problem that it is difficult to secure a sufficient amount of light because a size of a lens to be subjected to OIS is limited.

Specifically, in order to achieve the best optical characteristics in a camera module, an alignment between the lens groups at the time of OIS implementation should be well matched through movement of a lens or tilting of a module, but in the conventional OIS technology, when a decenter in which a spherical center between the lens groups deviates from an optical axis or a tilt which is a phenomenon of lens tilt occurs, there is a problem that adversely affects image quality or resolution.

In addition, the conventional OIS technology may implement AF or Zoom at the same time as OIS driving, but an OIS magnet and an AF or Zoom magnet are disposed close to each other due to space limitation of a camera module and a position of a driving part of the conventional OIS technology, and cause a magnetic field interference, and thus there is a problem that the OIS driving is not performed normally, and a decent or a tilt phenomenon is induced.

Further, in the conventional OIS technology, since a mechanical driving device is required for moving the lens or tilting the module, there is a problem that a structure is complicated and power consumption is increased.

Meanwhile, in a conventional camera module, a Hall sensor for detecting the position of a focus lens or a zoom lens and a coil driver for applying a current to a coil using the sensing information of the Hall sensor are disposed on different substrates. Accordingly, the conventional camera module has a long signal line until the signal sensed by the hall sensor is transmitted to the coil driver, and this has a problem in that the positional accuracy of the focus lens or the zoom lens is lowered due to noise generation.

Meanwhile, in recent years, due to the demand for integration of components used in a mobile environment, high performance and miniaturization of the mobile camera module are also required. In addition, power consumption increases due to the integration and high performance of the camera module, which causes the temperature of the components to rise. In addition, the temperature rise of the component causes a focusing error of the camera module, and accordingly, the accuracy of the algorithm for compensating for this is required.

In addition, recently, a camera module having a built-in temperature sensor has been provided, and a temperature compensation algorithm is applied using the camera module. However, the conventional temperature sensor is not disposed on a flexible printed circuit board (Flexible PCB) on which the coil is disposed, but is disposed on a rigid printed circuit board (Rigid PCB) on which the coil driver is disposed. Accordingly, the temperature sensor of the conventional camera module is not disposed around the coil, which is the main heat source, but is disposed on a rigid printed circuit board (Rigid PCB) different from the coil arrangement area. Accordingly, there is a problem in that the temperature compensation accuracy is lowered.

Meanwhile, contents described in items merely provide background information of the present disclosure and do not constitute the related art.

DISCLOSURE

Technical Problem

One of the technical problems of the embodiment is to provide an ultra-small, ultra-slim actuator and a camera module including the same.

In addition, one of the technical problems of the embodiment is to provide a camera module capable of reducing the focusing error rate by improving the accuracy of the temperature measurement and at the same time improving the accuracy of the temperature compensation algorithm, by disposing the temperature sensor near the coil, which is the main cause of heat generation, with respect to the arrangement of the temperature sensor.

In addition, one of the technical problems of the embodiment is to provide a camera module that can improve position detection accuracy and minimize loss due to signal noise by disposing a coil driver around the Hall sensor or applying a driving device in which the Hall sensor and the coil driver are integrally formed, regarding the arrangement of the Hall sensor and the coil driver.

In addition, one of technical problems of embodiments is to provide a camera actuator capable of preventing generation of friction torque when moving a lens by zooming in a camera module, and a camera module including the same.

In addition, one of the technical problems of the embodiments is to provide a camera actuator capable of preventing a lens decentering, a lens tilt, or occurrence of a phenomenon that a center axis of an image sensor does not coincide with a center of a lens during a lens shift through zooming in a camera module, and the camera module including the same.

In addition, one of the technical problems of the embodiments is to provide an ultra-thin and ultra-small camera actuator and a camera module including the same.

In addition, one of the technical problems of the embodiments is to provide a camera actuator that may secure a sufficient amount of light by eliminating lens size limitation of an optical system lens assembly when OIS is implemented, and a camera module including the same.

In addition, one of the technical problems of the embodiments is to provide a camera actuator capable of achieving the best optical characteristics and a camera module including the same by minimizing occurrence of a decenter or tilt phenomenon when the OIS is implemented.

In addition, one of the technical problems of the embodiments is to provide a camera actuator capable of preventing a magnetic field interference with an AF or Zoom magnet when the OIS is implemented, and a camera module including the same.

In addition, one of the technical problems of the embodiments is to provide a camera actuator capable of implementing the OIS with low power consumption, and a camera module including the same.

The technical effects of the embodiments are not limited to those described in this item, but include those that may be understood from the entire description of the invention.

Technical Solution

A camera module according to an embodiment may include a first circuit board on which the image sensor is disposed; a base disposed on the first circuit board; a lens assembly disposed within the base; and a third circuit board disposed on one side of the base, on which a coil part constituting the lens assembly and a driving device for controlling driving of the coil part are disposed, wherein the driving device comprises: a coil driver configured to apply a current to the coil, and a Hall sensor configured to sense a position of the lens assembly.

In addition, the driving device is disposed in an inner region of the coil part on the third circuit board.

In addition, the driving device is configured by integrating the coil driver part and the Hall sensor.

In addition, the driving device is configured by integrating the coil driver and a temperature sensor.

In addition, the camera module further includes a second circuit board disposed on the one side of the base and on which a gyro sensor is disposed, and wherein the coil part overlaps the second circuit board in a direction perpendicular to an optical axis direction.

In addition, the lens assembly comprises: a first lens assembly including a first lens barrel and a first magnet part; and a second lens assembly including a second lens barrel and a second magnet part, and wherein the third circuit board includes: a first region disposed on one side of the base and facing the first magnet part; and a second region disposed on the other side of the base and facing the second magnet part.

In addition, the coil part comprises: a first coil part disposed on the first region; and a second coil part disposed on the second region, wherein the driving device comprises: a first driving device disposed in an inner region of the first coil part; and a second driving device disposed in an inner region of the second coil part.

In addition, the camera module further comprises a fourth circuit board connected to the second circuit board and on which a connector is disposed.

In addition, the camera module further comprises a first guide part disposed on one side of the base and corresponding to the first lens assembly, a second guide part disposed on the other side of the base and corresponding to the second lens assembly, a first ball disposed between the first guide part and the first lens assembly; and a second ball disposed between the second guide part and the second lens assembly.

In addition, the first lens assembly includes a first groove in which the first ball is disposed, and the second lens assembly includes a second groove in which the second ball is disposed, and the first guide part, the first ball, and the first groove are disposed on a virtual straight line from the one side toward the other side.

In addition, the first guide part may include a first-first rail of a first shape and a first-second rail of a second shape, the second guide part may include a second-first rail of the first shape and a second-second rail of the second shape, and the first shape of the first guide part and the second shape of the first guide part may be different shapes, the first-first rail of the first shape and the second-first rail of the first shape may be positioned diagonally, and the first-second rail of the second shape and the second-second rail of the second shape may be positioned diagonally.

In addition, the first guide part may include two first rails, and the second guide part may include two second rails, the first magnet part is corresponded to the two first rails, and the second magnet part is corresponded to the two second rails.

In addition, the camera module may further include a housing disposed on the base; a prism disposed within the housing; and an OIS unit disposed between the housing and the prism.

In addition, the camera module may further include a circuit board for OIS in which a third coil part for driving the OIS unit is disposed, disposed in the base and the housing, and connected to the second circuit board.

In addition, the OIS unit may include a lens unit; shaper unit; and a third magnet unit coupled to the shaper unit and driving the lens unit.

Advantageous Effects

In the embodiment, in relation to the arrangement of the hall sensor of the camera module, the hall sensor and the coil driver are arranged close to each other, so that noise generated in the signal line between the hall sensor and the coil driver can be minimized. Accordingly, there is an effect of improving the position measurement accuracy. More preferably, in relation to the arrangement of the Hall sensor of the camera module, the length of the signal line between the conventional Hall sensor and the coil driver can be minimized by using a driving device in which the Hall sensor and the coil driver are integrated. Accordingly, signal noise can be removed.

For example, in the embodiment, the Hall sensor and the coil driver are disposed on the same single substrate, or a driving device in which the Hall sensor and the coil driver are integrated is used. In this case, the driving device may be disposed together with the coil part on a substrate on which the coil part is disposed. More preferably, the driving device in the embodiment is an IC in which a Hall sensor and a coil driver are integrated, and accordingly, the driving device may be disposed in an inner region of the coil on a substrate on which the coil is disposed. Accordingly, it is possible to implement a compact camera module by reducing the area occupied by the driving device.

In addition, in the embodiment, a driving device in which a coil driver, a Hall sensor, and a temperature sensor are integrated is disposed on the third circuit board 43. Accordingly, in the embodiment, among the connection pads connecting the third circuit board 43 and the first circuit board 44, the connection pad corresponding to the signal line between the conventional coil driver and the Hall sensor may be deleted. In addition, the connection pad may act as a factor of heat generation, and as the number of connection pads increases, the heat generation value increases. In this case, in the embodiment, heat generation can be minimized by reducing the number of the connection pads, and various operational reliability problems that may be caused by the heat generation can be solved. In the embodiment, as the Hall sensor and the coil driver are integrated as described above, the number of capacitors for power filtering can be remarkably reduced, thereby reducing the component cost. Also, in the embodiment, as the coil driver disposed on the first circuit board 44 is removed, the number of layers of the first circuit board 44 may be reduced to four or less.

In addition, in the embodiment, the coil driver and the Hall sensor are disposed adjacent to each other on the same substrate. More preferably, in the embodiment, position sensing and coil part control are performed by the first driving device 53*a* and the second driving device 53*b* in which the coil driver and the hall sensor are integrally formed with each other. Accordingly, in the embodiment, the length of the circuit wiring between the conventional coil driver and the Hall sensor can be minimized, and thus signal loss due to noise can be minimized.

In addition, in the embodiment, the driving device and the coil part are disposed adjacent to each other on the same substrate. Accordingly, in the embodiment, it is possible to minimize a solder contact resistance due to the solder existing in the signal line between the conventional coil driver and the Hall sensor, and accordingly, the current loss can be minimized.

Also, in the embodiment, a temperature sensor is disposed on the third circuit board 43 around the first driving device 53*a* and the second driving device 53*b*. Preferably, the camera module may include a first temperature sensor disposed together with the first driving device 53*a* in an inner region of the first coil part 141*b*. In addition, the camera module may include a second temperature sensor disposed together with the second driving device 53*b* in the inner region of the second coil part 142*b*. More preferably, the first driving device 53*a* and the second driving device 53*b* are ICs in which a coil driver, a Hall sensor, and a temperature sensor are integrated. Accordingly, in the embodiment, the temperature is sensed around the coil part, which is the main heating factor of the camera module, and based on this, by performing a temperature compensation algorithm on the first driving device 53*a* and the second driving device 53*b*, temperature compensation accuracy can be improved.

The embodiment has a technical effect that can provide an ultra-small, ultra-thin actuator and a camera module including the same.

For example, according to the embodiment, as the gyro sensor is disposed on a circuit board that is perpendicular to the horizontal coordinate axis (x-axis) direction and extends in a horizontal direction to the optical axis (z-axis) direction, it is possible to control the size of the actuator to the level of the horizontal width of the housing. Thereby, it is possible to implement an ultra-small and ultra-thin actuator and a camera module including the same.

For example, in the prior art, a gyro sensor was disposed on a circuit board extending in the horizontal coordinate axis (x-axis) direction from the actuator, and the horizontal width of the circuit board reached about 3 to 4 mm. The embodiment can reduce the horizontal area by about 25% or more by reducing the horizontal width of the circuit board, so there is a technical effect that can implement an ultra-small, ultra-thin actuator and a camera module including the same.

According to a camera actuator and a camera module including the same according to an embodiment, there is a technical effect that may solve a problem of generation of friction torque during zooming.

For example, according to the embodiment, a lens assembly is driven in a state in which the first guide part and the second guide part, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming.

In addition, a camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly, and thus there is a technical effect that accuracy of alignment may be improved.

In addition, according to the embodiment, a center of a protrusion of the first guide part and a center of a groove of the third housing do not coincide, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

Further, according to the embodiment, a center of a protrusion of the base and centers of grooves of the first and second guide parts do not coincide with each other, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

In addition, two rails for each lens assembly are provided, and thus there is a technical effect that even though any one of the rails is distorted, the accuracy may be secured by the other one.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In the related art, when guide rails are disposed on the base itself, a gradient is generated along an injection direction, and thus there is difficulty in dimensional control, and there was a technical problem that friction torque increases and driving force decreases when injection is not performed normally.

On the other hand, according to the embodiment, the first guide part and the second guide part which are formed separately from the base are applied separately without disposing the guide rails on the base itself, and thus there is a special technical effect that generation of a gradient along the injection direction may be prevented.

In addition, according to the embodiment, there is a technical effect that it is possible to provide an ultra-thin and ultra-small camera actuator and a camera module including the same.

For example, according to the embodiment, the image shaking control unit 220 is disposed so as to utilize a space below the prism unit 230 and overlap each other, and thus there is a technical effect that it is possible to provide an ultra-thin and ultra-small camera actuator and a camera module including the same.

In addition, according to the embodiment, there is a technical effect that it is possible to provide a camera actuator capable of securing a sufficient amount of light and a camera module including the same by eliminating lens size limitation of an optical system lens assembly when the OIS is implemented.

For example, according to the embodiment, the image shaking control unit 320 is disposed below the prism unit 330, and thus there is a technical effect that when the OIS is implemented, lens size limitation of an optical system lens assembly may be eliminated, and a sufficient amount of light may be secured.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the image shaking control unit 220 stably disposed on the housing 210 is provided, and a shaper unit 322 described later and a first driving part 72M are included, and thus there is a technical effect that it is possible to provide a camera actuator capable of achieving the best optical characteristics and a camera module including the same by minimizing occurrence of a decenter or tilt phenomenon when the OIS is implemented through a lens unit 322c including a tunable prism 322cp.

In addition, according to the embodiment, there is a technical effect that it is possible to provide a camera actuator capable of preventing a magnetic field interference with an AF or Zoom magnet and a camera module including the same when the OIS is implemented.

For example, according to the embodiment, when the OIS is implemented, the first driving part 72M, which is a magnet driving part, is disposed on the second camera actuator 200 separated from the first camera actuator or the first camera module 100, and thus there is a technical effect that that it is possible to provide a camera actuator capable of preventing a magnetic field interference with an AF or Zoom magnet and a camera module including the same.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by driving the shaper unit 222 through the lens unit 222c including the tunable prism, the first driving part 72M which is a magnet driving part, and the second driving part 72C which is a coil driver, and thus there is a technical effect that it is possible to provide a camera actuator capable of implementing the OIS with low power consumption and a camera module including the same.

In addition, according to the embodiment, the prism unit 230 and the lens unit 222c including the tunable prism may be disposed very close to each other, and thus there is a special technical effect that even though the change in the optical path is made fine in the lens unit 222c, the change in the optical path may be widely secured in the actual image sensor unit.

The technical effects of the embodiments are not limited to those described in this item, but include those that may be understood from the entire description of the invention.

DESCRIPTION OF DRAWINGS

FIG. 1 is a perspective view of a camera module according to an embodiment.

FIG. 2 is a perspective view in which a part of a configuration of the camera module according to the embodiment shown in FIG. 1 is omitted.

FIG. 3 is an exploded perspective view in which a part of a configuration of the camera module according to the embodiment shown in FIG. 1 is omitted.

FIG. 4 is a perspective view of a first guide part and a second guide part of the camera module according to the embodiment shown in FIG. 3.

FIG. 5 is an additional perspective view of the first guide part and the second guide part of the embodiment shown in FIG. 4.

FIG. 6A is a perspective view of the first guide part of the embodiment shown in FIG. 5.

FIG. 6B is a perspective view in a left direction of the first guide part of the embodiment shown in FIG. 6A.

FIG. 7A is a perspective view of a first lens assembly of the camera module according to the embodiment shown in FIG. 3.

FIG. 7B is a perspective view in which a part of a configuration of the first lens assembly 110 shown in FIG. 7A is removed.

FIG. 8A is a cross-sectional view taken along line B1-B2 in the camera module according to the embodiment shown in FIG. 2.

FIG. 8B is a driving example view of a camera module according to an embodiment.

FIG. 9 is a perspective view of a third lens assembly in the camera module according to the embodiment shown in FIG. 3 in a first direction.

FIG. 10 is a perspective view of the third lens assembly 130 shown in FIG. 9 in a second direction.

FIG. 11A is a perspective view of a base of the camera module according to the embodiment shown in FIG. 3.

FIG. 11B is a front view of the base shown in FIG. 11A.

FIG. 12 is an enlarged view of a first region of the base shown in FIG. 11B.

FIG. 13 is an illustrative view showing a combination of a third lens assembly and a first guide part in the camera module according to the embodiment shown in FIG. 3.

FIG. 14 is an enlarged view showing a coupling region of the third lens assembly shown in FIG. 13.

FIG. 15 is a cross-sectional example view showing a combination of the third lens assembly and the first guide part shown in FIG. 13.

FIG. 16 is an illustrative view showing a combination of a base and a first guide part of the camera module according to the embodiment shown in FIG. 3.

FIG. 17 is an enlarged view showing a coupling region of the first guide part shown in FIG. 16.

FIG. 18 a cross-sectional example view showing a combination of the base and the first guide part shown in FIG. 16.

FIG. 19A is a perspective view in which a part of a configuration of the camera module according to the embodiment shown in FIG. 1 is omitted.

FIGS. 19B and 19C is a perspective view of the circuit board of the embodiment shown in FIG. 1.

FIG. 19d is an exploded perspective view of the circuit board of the embodiment shown in FIG. 1.

FIG. 19E is a diagram for explaining a temperature compensation operation of a camera module;

FIG. 20 is a perspective view showing a camera module of an embodiment including a second camera actuator.

FIG. 21A is a perspective view of the second camera actuator in the camera module of the embodiment shown in FIG. 20 in a first direction.

FIG. 21B is a perspective view of the second camera actuator in the camera module of the embodiment shown in FIG. 20 in a second direction.

FIG. 22A is a perspective view of a first circuit board and a coil part of the second camera actuator of the embodiment shown in FIG. 21B.

FIG. 22B is a partially exploded perspective view of the second camera actuator of the embodiment shown in FIG. 21B.

FIG. 22C is a perspective view in which the first circuit board is removed from the second camera actuator of the embodiment shown in FIG. 21B.

FIG. 23A is an exploded perspective view of an image shaking control unit of the second camera actuator of the embodiment shown in FIG. 22B.

FIG. 23B is a combined perspective view of the image shaking control unit of the second camera actuator of the embodiment shown in FIG. 23A.

FIG. 23C is an exploded perspective view of the first driving part of the image shaking control unit 320 shown in FIG. 23A FIG. 24 is a perspective view of a shaper unit of the second camera actuator of the embodiment shown in FIG. 23A.

FIG. 25 is a cross-sectional view of a lens unit taken along line A1-A1' of the shaper unit shown in FIG. 24.

FIGS. 26A to 26B are illustrative views showing an operation of the second camera actuator of an embodiment.

FIG. 27 is a first operation example view of the second camera actuator of the embodiment.

FIG. 28 is a second operation example view of the second camera actuator of the embodiment.

FIG. 29 is a perspective view of a camera module according to another embodiment.

FIG. 30 is a perspective view of a mobile terminal to which a camera module according to an embodiment is applied.

DETAILED DESCRIPTION OF THE EMBODIMENTS

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

Embodiment

FIG. 1 is a perspective view of a camera module 100 according to an embodiment, FIG. 2 is a perspective view in which a part of the configuration of the camera module according to the embodiment shown in FIG. 1 is omitted, and FIG. 3 is an exploded perspective view in which a part of the configuration of the camera module according to the embodiment shown in FIG. 1 is omitted.

Referring to FIG. 1, the camera module 100 according to the embodiment may include a base 20, a circuit board 40 disposed outside the base 20, and a third lens assembly 130. The circuit board 40 may include a fourth circuit board 41, a second circuit board 42, a third circuit board 43, and a first circuit board 44.

FIG. 2 is a perspective view in which the base 20 and the circuit board 40 are omitted in FIG. 1, and referring to FIG. 2, a camera module 100 according to an embodiment includes a first guide part 210, a second guide part 220, a first lens assembly 110, a second lens assembly 120, a third driving part 141, and a fourth driving part 142.

The third driving part 141 and the fourth driving part 142 may include a coil or a magnet.

For example, when the third driving part 141 and the fourth driving part 142 include the coil, the third driving part 141 may include a first coil part 141b and a first yoke 141a, and the fourth driving part 142 may include a second coil part 142b and a second yoke 142a.

Or, conversely, the third driving part 141 and the fourth driving part 142 may include the magnet.

In an xyz-axis direction shown in FIG. 3, a z-axis may refer to an optic axis direction or a direction parallel thereto, an xz plane represents the ground, and an x-axis may refer to a direction perpendicular to the z-axis on the ground (xz plane), and a y-axis may refer to a direction perpendicular to the ground.

Referring to FIG. 3, a camera module 100 according to an embodiment may include a base 20, a first guide part 210, a second guide part 220, a first lens assembly 110, a second lens assembly 120, and a third lens assembly 130.

For example, the camera module 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first ball 117 (see FIG. 7A) disposed between the first lens assembly 110 and the first guide part 210, and a second ball (not shown) disposed between the second guide part 220 and the second lens assembly 120.

In addition, the embodiment may include the third lens assembly 130 disposed in front of the first lens assembly 110 in the optic axis direction.

Hereinafter, specific features of the camera apparatus according to the embodiment will be described with reference to the drawings.

<Guide Part>

Referring to FIG. 2 and FIG. 3, the embodiment may include a first guide part 210 disposed adjacent to the first side wall 21a (see FIG. 11A) of the base 20, and a second guide part 220 disposed adjacent to the second side wall 21b (referring to FIG. 11A) of the base 20.

The first guide part 210 may be disposed between the first lens assembly 110 and the first side wall 21a of the base 20.

The second guide part 220 may be disposed between the second lens assembly 120 and the second side wall 21b of the base 20. The first side wall 21a and the second side wall 21b of the base may be disposed to face each other.

According to the embodiment, a lens assembly is driven in a state in which the first guide part 210 and the second guide part 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming, In the related art, when guide rails are disposed on the base itself, a gradient is generated along an injection direction, and thus there is difficulty in dimensional control, and there was a technical problem that friction torque increases and driving force decreases when injection is not performed normally.

On the other hand, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide part 210 and the second guide part 220 are injected separately from the base 20, it is possible to prevent generation of a gradient remarkably as compared with the related art, and thus there is a special technical effect that precise injection may be performed and generation of a gradient due to injection may be prevented.

In the embodiment, the first guide part 210 and the second guide part 220 may be injected on an X axis, and a length injected may be shorter than the base 20. In this case, when rails 212 and 222 are disposed on the first guide part 210 and the second guide part 220, generation of a gradient during injection may be minimized, and there is a technical effect that possibility that the straight line of the rail is distorted is low.

FIGS. 4 and 5 are exploded perspective views of a first guide part 210 and a second guide part 220 of the camera module according to the embodiment.

Referring to FIG. 4, in an embodiment, the first guide part 210 may include a single or a plurality of first rails 212. In addition, the second guide part 220 may include a single or a plurality of second rails 222.

For example, the first rail 212 of the first guide part 210 may include a first-first rail 212a and a first-second rail 212b. The first guide part 210 may include a first support portion 213 between the first-first rail 212a and the first-second rail 212b.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide part 210 to the other surface thereof.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In addition, the first guide part 210 may include a first guide protruding portion 215 that extends in a side surface direction perpendicular to a direction in which the first rail 212 extends.

A first protrusion 214p may be included on the first guide protruding portion 215. For example, the first protrusion 214p may include a first-first protrusion 214p1 and a first-second protrusion 214p2.

Referring to FIG. 4, in the embodiment, the second guide part 220 may include a single or a plurality of second rails 222.

For example, the second rail 222 of the second guide part 220 may include a second-first rail 222a and a second-second rail 222b. The second guide part 220 may include a second support portion 223 between the second-first rail 222a and the second-second rail 222b.

The second rail 222 may be connected from one surface of the second guide part 210 to the other surface thereof.

In addition, the second guide part 220 may include a second guide protruding portion 225 that extends in a side surface direction perpendicular to a direction in which the second rail 222 extends.

A second protrusion 224p including a second-first protrusion 224p1 and a second-second protrusion 224p2 may be included on the second guide protruding portion 225.

The first-first protrusion 214p1 and first-second protrusion 214p2 of the first guide part 210 and the second-first protrusion 224p1 and second-second protrusion 224p2 of the second guide part 220 may be coupled to a third housing 21 of a third lens assembly 130 described later.

According to the embodiment, the first guide part 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide part 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

In the related art, when guide rails are disposed on the base itself, a gradient is generated along an injection direction, and thus there is difficulty in dimensional control, and there was a technical problem that friction torque increases and driving force decreases when injection is not performed normally.

Next, referring to FIG. 5, the first rail 212 of the first guide part 210 may include a first-first rail 212a having a first shape R1 and a first-second rail 212b having a second shape R2.

Further, the second rail 222 of the second guide part 220 may include a second-first rail 222a of the first shape R1 and a second-second rail 222b of the second shape R2.

The first shape R1 of the first guide part 210 and the second shape R2 of the first guide part 210 may be different shapes.

For example, the first shape R1 of the first guide part 210 and the second guide part 220 may be a V-shape. The second shape R2 of the first guide part 210 and the second guide part 220 may be an L-shape, but the embodiment is not limited thereto.

The first-first rail 212a of the first shape R1 and the second-first rail 222a of the first shape R1 may be positioned diagonally.

The first-second rail 212b of the second shape R2 and the second-second rail 222b of the second shape R2 may be positioned diagonally.

Subsequently, referring to FIG. 5, the first guide part 210 may include a single or a plurality of first guide part holes 210h in which a protrusion of a base is coupled in a first guide protrusion 215. For example, the first guide part hole 210h may include a first regular hole 210ha and a first long hole 210hb in the first guide protrusion 215. In the embodiment, the first regular hole 210ha is firmly coupled to the first guide protrusion 215, and the first long hole 210hb is formed larger than the first guide protrusion 215, and thus there is a special technical effect that generation of a minute tolerance of the first guide protrusion 215 generated in a Y-axis direction may be covered and rotation in an X-axis direction may be prevented. A regular hole and a long hole described below may also perform the same function.

In the embodiment, a first-second distance D12 of the plurality of first guide part holes 210h to which a protrusion of the base 20 is coupled may be different from a first-first distance D11 between first protrusions 214p of the plurality of first guide parts 210, and accordingly, a coupling axis is formed in various ways, and a stable coupling force may be secured, thereby improving mechanical reliability.

For example, the first-second distance D12 of the plurality of first guide part holes 210h to which the protrusion of the base 20 is coupled may be formed wider than the first-first distance D11 between the first protrusions 214p of the plurality of first guide parts 210 coupled to a housing, and accordingly, a stable coupling force may be secured and mechanical reliability may be improved, but a length of the distance is not limited thereto.

The first regular hole 210ha may be a circular hole, and in the first long hole 210hb, a diameter in a first axis direction may be different from that in a second axis direction perpendicular the first axis direction. For example, in the first long hole 210hb, a diameter in the y-axis direction perpendicular to the x-axis may be larger than that in the x-axis direction horizontal to the ground.

In addition, the second guide part 220 may include a single or a plurality of second guide part holes 220h in a second guide protrusion 225. For example, the second guide part hole 220h may include a second regular hole 220ha and a second long hole 220hb in the second guide protrusion 225.

In addition, in the embodiment, a second-second distance D22 of the plurality of second guide part holes 220h to which a protrusion of the base 20 is coupled may be different from a second-first distance D21 between second protrusions 224p of the plurality of second guide parts 220, and accordingly, a coupling axis is formed in various ways, and a stable coupling force may be secured, thereby improving mechanical reliability.

For example, the second-second distance D22 of the plurality of second guide part holes 220h to which the protrusion of the base 20 is coupled may be formed wider than the second-first distance D21 between the second protrusions 224p of the plurality of second guide parts 220 coupled to the housing, and accordingly, a stable coupling force may be secured and mechanical reliability may be improved, but a length of the distance is not limited thereto.

The second regular hole 220ha may be a circular hole, and in the second long hole 220hb, a diameter in a first axis direction may be different from that in the second axis direction perpendicular the first axis direction. For example, in the second long hole 220hb, a diameter in the y-axis direction perpendicular to the x-axis may be larger than that in the x-axis direction horizontal to the ground.

The first regular hole 210ha and the second regular hole 220ha may be positioned diagonally. In addition, the first long hole 210hb and the second long hole 220hb may be positioned diagonally. However, the embodiment is not limited thereto, the first regular hole 210ha and the second regular hole 220ha may be positioned at an upper portion, and the first long hole 210hb may be disposed below the first regular hole 210ha. In addition, the first long hole 210hb and the second long hole 220hb may be positioned at a parallel position, and the second long hole 220hb may be disposed below the second regular hole 220ha. The first long hole 210hb may be disposed above the first regular hole 210ha, and the second long hole 220hb may be disposed above the second regular hole 220ha.

Next, FIG. 6A is a perspective view of the first guide part 210 of the embodiment shown in FIG. 5, and FIG. 6B is a perspective view in a left direction of the first guide part 210 of the embodiment shown in FIG. 6A.

In the embodiment, a first-first recess 214r1 in a circular shape may be disposed around a first-first protrusion 214p1 of the first guide part 210. Further, in the embodiment, a first-second recess 214r2 in a circular shape may be disposed around a first-second protrusion 214p2 of the first guide part 210.

In addition, a second-first recess (not shown) in a circular shape may be disposed around a second-first protrusion 224p1 of the second guide part 220. Further, a second-second recess (not shown) in a circular shape may be disposed around a second-second protrusion 224p2 of the second guide part 220.

According to the embodiment, there is a technical effect that when the first-first protrusion 214p1 and the first-second protrusion 214p2 are formed, generation of burrs therearound may be prevented by the first-first recess 214r1 and the first-second recess 214r2 are disposed around the first-first protrusion 214p1 and the first-second protrusion 214p2 of the first guide part 210, respectively.

Accordingly, there is a technical effect that the first-first protrusion 214p1 and the first-second protrusion 214p2 of the first guide part 210 may be firmly and tightly coupled to a third housing 21.

Next, referring to FIG. 6A, a single or a plurality of first ribs 217 may be disposed between a first support portion 213 and a first-second rail 212b.

In the related art, as an amount of an injected material increases or as a thickness of the injected material increases, shrinkage occurs, which makes it difficult to control dimensions, but on the other hand, when the amount of the injected material is reduced, a contradiction occurs in which strength is weakened.

According to the embodiment, the first rib 217 is disposed between the first support portion 213 and the first-second rail 212b, and thus there is a complex technology effect that accuracy of dimensional control may be improved by reducing the amount of injection material, and strength may be secured.

Next, referring to FIG. 6B, a first rail 212 of the first guide part 210 may include a rail part recess 212rb. In addition, the first support portion 213 of the first guide part 210 may include a support portion recess 213r.

According to the embodiment, the rail part recess 212rb and the support portion recess 213r is provided in the first guide part 210, and thus there is a complex technology effect that accuracy of dimensional control may be improved and strength may be secured by reducing the amount of injection material to prevent shrinkage.

In addition, referring to FIG. 6B, the first guide part 210 may include a first-third protrusion 214p3 disposed in a region opposite to the first-first protrusion 214p1, and the first-fourth protrusion 214p4 disposed in a region opposite to the first-second protrusion 214p2.

The first-third protrusion 214p3 and the first-fourth protrusion 214p4 may be coupled to a base hole of a third side wall 21c of a base 20 described later.

<First and Second Lens Assemblies and Balls>

Next, FIG. 7A is a perspective view of a first lens assembly 110 of the camera module according to the embodiment shown in FIG. 3, and FIG. 7B is a perspective view in which a part of a configuration of the first lens assembly 110 shown in FIG. 7A is removed.

Referring briefly to FIG. 3, the embodiment may include a first lens assembly 110 moving along the first guide part 210 and a second lens assembly 120 moving along the second guide part 220.

Referring again to FIG. 7A, the first lens assembly 110 may include a first lens barrel 112a on which a first lens 113 is disposed and a first driving part housing 112b on which a first driving part 116 is disposed. The first lens barrel 112a and the first driving part housing 112b may be a first housing, and the first housing may be in a barrel shape or a lens-barrel shape. The first driving part 116 may be a magnet driving part, but the embodiment is not limited thereto, and in some cases, a coil may be disposed therein.

In addition, the second lens assembly 120 may include a second lens barrel (not shown) on which a second lens (not shown) is disposed and a second driving part housing (not shown) on which a second driving part (not shown) is disposed. The second lens barrel (not shown) and the second driving part housing (not shown) may be a second housing, and the second housing may be in a barrel shape or a lens-barrel shape. The second driving part may be a magnet driving part, but the embodiment is not limited thereto, and in some cases, a coil may be disposed therein.

The first driving part 116 may correspond to the two first rails 212, and the second driving part may correspond to the two second rails 222.

In the embodiment, it is possible to drive using a single or a plurality of balls. For example, the embodiment may include a first ball 117 disposed between the first guide part 210 and the first lens assembly 110 and a second ball (not shown) disposed between the second guide part 220 and the second lens assembly 120.

For example, in the embodiment, the first ball 117 may include a single or a plurality of first-first balls 117a disposed above the first driving part housing 112b and a single or a plurality of first-second balls 117b below the first driving part housing 112b.

In the embodiment, the first-first ball 117a of the first ball 117 may move along a first-first rail 212a which is one of the first rails 212, and the first-second ball 117b of the first balls 117 may move along a first-second rail 212b which is another one of the first rails 212.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly 110, and thus there is a technical effect that accuracy of alignment between the second lens assembly 120 and an optic axis may be improved when the first lens assembly 110 moves.

Referring also to FIG. 7B, in an embodiment, the first lens assembly 110 may include a first assembly groove 112b1 on which the first ball 117 is disposed. The second lens assembly 120 may include a second assembly groove (not shown) on which the second ball is disposed.

The first assembly groove 112b1 of the first lens assembly 110 may be in plural. In this case, a distance between two first assembly grooves 112b1 of the plurality of first assembly grooves 112b1 with respect to an optic axis direction may be longer than a thickness of the first lens barrel 112a.

In the embodiment, the first assembly groove 112b1 of the first lens assembly 110 may be in a V-shape. Further, the second assembly groove (not shown) of the second lens assembly 120 may be in a V-shape. The first assembly groove 112b1 of the first lens assembly 110 may be in a U-shape in addition to the V-shape, or a shape that contacts the first ball 117 at two or three points. In addition, the second assembly groove (not shown) of the second lens assembly 120 may be in a U-shape in addition to the V-shape, or a shape that contacts the first ball 117 at two or three points.

Referring to FIG. 2 and FIG. 7A, in the embodiment, the first guide part 210, the first ball 117, and the first assembly groove 112b1 may be disposed on a virtual straight line from the first side wall 21a toward the second side wall 21b. The first guide part 210, the first ball 117, and the first assembly groove 112b1 may be disposed between the first side wall 21a and the second side wall 21b.

Referring to FIG. 8, in the first lens assembly 110, an assembly protrusion 112b2 may be disposed at a position opposite to the first assembly groove 112b1. In the embodiment, strength according to disposition of the assembly groove 112b1 is maintained by the assembly protrusion 112b2, and a recess region is provided at an upper end of the assembly protrusion 112b2 to reduce an amount of an injected material, thereby increasing accuracy of dimensional control by preventing shrinkage.

Next, FIG. 8A is a cross-sectional view taken along line B1-B2 in the camera module according to the embodiment shown in FIG. 2.

According to the embodiment, the first guide part 210 and the second guide part 220 may be disposed and inserted into the base 20, respectively, the first lens assembly 110 may be disposed to correspond to the first guide part 210, and the second lens assembly 120 may be disposed to correspond to the second guide part 220.

Meanwhile, according to the embodiment, there is a technical effect that it is possible to prevent the first lens assembly 110 and the second lens assembly 120 from being reversely inserted into the base 20.

For example, referring to FIG. 8A, a first upper portion and a first lower portion of the base 20 on which the first driving part housing 112b of the first lens assembly 110 is disposed may be spaced apart at a first distance A20.

In addition, a second upper portion and a second lower portion of the base 20 on which the first driving part housing 122b of the second lens assembly 120 is disposed may be spaced apart at a second distance A20.

In this case, a vertical width of the first driving part housing 112b may include a first width A110, and a vertical width of the second driving part housing 122b may include a second width B120.

In this case, unlike a distance and a width shown in FIG. 8A, when a dimensional control is designed so that the second width B120 which is the vertical width of the second driving part housing 122b is larger than the first distance A20 between the first upper portion and the first lower portion of the base 20, the second lens assembly 120 is not inserted into a base region in which the first lens assembly 110 is mounted, and thus there is a technical effect that reverse inserting is prevented.

In addition, unlike a distance and a width shown in FIG. 8A, when a dimensional control is designed so that the first width A110 which is the vertical width of the first driving part housing 112b is larger than the second distance B20 between the second upper portion and the second lower portion of the base 20, the first lens assembly 110 is not inserted into a base region in which the second lens assembly 120 is mounted, and thus there is a technical effect that reverse inserting is prevented.

Next, FIG. 8B is a driving example view of the camera module according to the embodiment.

An interaction in which an electromagnetic force DEM is generated between a first magnet 116 and a first coil part 141b in the camera module according to the embodiment will be described with reference to FIG. 8B.

As shown in FIG. 8B, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141b. Accordingly, the N-pole 116N and the S-pole 116S of the first magnet 116 may be respectively disposed so as to correspond to a region in which current flows in a y-axis direction perpendicular to the ground at the first coil part 141b.

Referring to FIG. 8B, in the embodiment, a magnetic force DM is applied in a direction opposite to an x-axis at the N-pole 116N of the first magnet 116, and when a current DE flows in a y-axis direction in a region of the first coil part 141b corresponding to the N-pole 116N, the electromagnetic force DEM acts in a z-axis direction based on the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141b corresponding to the S pole 116S, the electromagnetic force DEM acts in a z-axis direction based on the Fleming's left-hand rule.

At this time, since a third driving part 141 including the first coil part 141b is in a fixed state, the first lens assembly 110, which is a mover on which the first magnet 116 is disposed, may be moved back and forth along a rail of the first guide part 210 in a direction parallel to the z-axis direction by the electromagnetic force DEM according to a current direction. The electromagnetic force DEM may be controlled in proportion to the current DE applied to the first coil part 141b.

Likewise, an electromagnetic force DEM is generated between a second magnet (not shown) and the second coil part 142b of the camera module according to the embodiment, and thus the second lens assembly 120 may be moved along a rail of the second guide part 220 horizontally with respect to the optic axis.

<Third Lens Assembly>

Next, FIG. 9 is a perspective view of a third lens assembly 130 in the camera module according to the embodiment shown in FIG. 3 in a first direction, and FIG. 10 is a perspective view of the third lens assembly 130 shown in FIG. 9 in a second direction, and is a perspective view in which a third lens 133 is removed.

Referring to FIG. 9, in an embodiment, the third lens assembly 130 may include a third housing 21, a third barrel 131, and a third lens 133.

In the embodiment, the third lens assembly 130 includes a barrel recess 21r at an upper end of the third barrel 131, and thus there is a complex technology effect that a thickness of the third barrel 131 of the third lens assembly 130 may be adjusted to be constant, and accuracy of dimensional control may be improved by reducing an amount of injection material.

In addition, according to the embodiment, the third lens assembly 130 may include a housing rib 21a and a housing recess 21b in the third housing 21.

In the embodiment, the third lens assembly 130 includes the housing recess 21b in the third housing 21, and thus there is a complex technology effect that accuracy of dimensional control may be improved by reducing the amount of injection material, and strength may be secured by including the housing rib 21a in the third housing 21.

Next, referring to FIG. 10, the third lens assembly 130 may include a single or a plurality of housing holes in a third housing 21. For example, the housing hole may include a third regular hole 22ha and a third long hole 22hb around a third barrel 131 of the third housing 21.

The housing hole may be coupled to a first protrusion 214p of a first guide part 210 and a second protrusion 224p of a second guide part 220.

The third regular hole 22ha may be a circular hole, and in the third long hole 22hb, a diameter in a first axis direction may be different from that in a second axis direction perpendicular the first axis direction. For example, in the third long hole 22hb, a diameter in the y-axis direction perpendicular to the x-axis may be larger than that in the x-axis direction horizontal to the ground.

The housing hole of the third lens assembly may include two third regular hole 22*ha* and two third long hole 22*hb*.

The third regular hole 22*ha* may be disposed below the third housing 21, and the third long hole 22*hb* may be disposed above the third housing 21, but the embodiment is not limited thereto. The third long hole 22*hb* may be positioned diagonally to each other, and the third regular hole 22*ha* may be positioned diagonally to each other.

In an embodiment, the third housing 21 of the third lens assembly 130 may include a single or a plurality of housing protrusions 21*p*. In the embodiment, the housing protrusion 21*p* is provided inside the third housing 21, and thus it is possible to prevent reverse insertion, and to prevent the third housing 21 from being coupled to the base 20 by turning left and right.

The number of the housing protrusions 21*p* may be plural, for example, four, but the embodiment is not limited thereto. Referring also to FIG. 11B, the housing protrusion 21*p* may be coupled to a side recess 23*a* disposed on a base-side protruding portion 23*a*.

<Base>

Next, FIG. 11A is a perspective view of the base 20 of the camera module according to the embodiment shown in FIG. 3, FIG. 11B is a front view of the base 20 shown in FIG. 11A, and FIG. 12 is an enlarged view of a first region 21*c*A of the base 20 shown in FIG. 11B.

Referring to FIG. 3, the first guide part 210, the second guide part 220, the first lens assembly 110, the second lens assembly 120, etc. may be disposed in the base 20 according to the embodiment. The third lens assembly 130 may be disposed at one side surface of the base.

Referring again to FIG. 11A, the base 20 may have a rectangular parallelepiped shape having a space therein.

For example, the base 20 may include a first side wall 21*a*, a second side wall 21*b*, a third side wall 21*c*, and a fourth side wall 21*d*, and the base 20 may include a plurality of side walls and a base upper surface 21*e*, and a base lower surface 21*f*.

For example, the base 20 may include the first side wall 21*a* and the second side wall 21*b* corresponding to the first side wall 21*a*. For example, the second side wall 21*b* may be disposed in a direction facing the first side wall 21*a*.

The first side wall 21*a* and the second side wall 21*b* may include a first opening 21*b*O and a second opening (not shown), respectively.

In addition, the base 20 may further include the third side wall 21*c* disposed between the first side wall 21*a* and the second side wall 21*b* and connecting the first side wall 21*a* and the second side wall 21*b*. The third side wall 21*c* may be disposed in a direction perpendicular to the first side wall 21*a* and the second side wall 21*b*.

The first, second, and third side walls 21*a*, 21*b*, and 21*c* may be formed in an injection shape integrally with each other, or may be in a form in which each of configurations is coupled.

Referring to FIG. 11*b*, a base protrusion may be disposed on the fourth side wall 21*d* of the base 20.

The base protrusion may include a first base protrusion 22*p*1, a second base protrusion 22*p*2, a third base protrusion 22*p*3, and a fourth base protrusion 22*p*4 disposed on the fourth side wall 21*d*.

The first to fourth base protrusions 22*p*1, 22*p*2, 22*p*3, and 22*p*4 may be coupled to a first guide part hole 210*h* and a second guide part hole 220*h*.

The fourth side wall 21*d* may be in an opened form, and may include a fourth opening 21*d*O.

The first guide part 210, the second guide part 220, the first lens assembly 110, and the second lens assembly 120 may be detachably coupled to the inside of the base 20 through the fourth opening 21*d*O.

Next, referring to FIGS. 11A and 11B, the base 20 may include a base protruding portion 23*b* protruding in a z-axis direction from the fourth side wall 21*d*. In the embodiment, the base protruding portion 23*b* is provided on the fourth side wall 21*d*, so that when the first guide part 210 and the second guide part 220 are assembled to the base 20, epoxy or adhesive is applied for bonding between the base 20 and the third housing 21 of the third lens assembly, thereby improving a strong bonding force.

In addition, the embodiment may include a side protruding portion 23*a* extending in an x-axis direction of the fourth side wall 21*d* of the base 20. The side protruding portion 23*a* of the base 20 may serve a guiding function when a main FPCB (sensor FPCB) is coupled to the base 20.

Subsequently, referring to FIG. 11A, the base 20 may include the base upper surface 21*e* and the base lower surface 21*f*.

The base upper surface 21*e* may include a base upper groove 21*er*.

In the embodiment, the base upper groove 21*er* is provided on the base upper surface 21*e*, and thus a thickness of a cross section thickened for assembling the first and second guide parts 210 and 220 is constant, thereby preventing shrinkage during injection.

The base upper surface 21*e* may include a base upper rib 21*ea*.

In the embodiment, the base upper rib 21*ea* is disposed on the base upper surface 21*e*, and thus it is possible to serve as a guide at the time of placing a third circuit board 43, and serve a function of matching a thickness of the region on which the third circuit board 43 is seated and the other regions.

In addition, in the embodiment, the base lower surface 21*f* may include a base step 21*s*.

In the embodiment, the base step 21*s* is provided at the base lower surface 21*f*, thereby improving robust reliability of the first and second driving parts mounted therein.

Next, FIG. 12 is an enlarged view of the first region 21*c*A of the third side wall 21*c* of the base shown in FIG. 11B.

In an embodiment, the third side wall 21*c* of the base may include a base hole.

For example, the base hole may include a single or a plurality of regular holes and a single or a plurality of long holes on the third side wall 21*c*.

For example, the third side wall 21*c* may include a fourth-first regular hole 21*ha*1, a fourth-second regular hole 21*ha*2, a fourth-first long hole 21*hb*1, and a fourth-second long hole 21*hb*2.

The base hole may be coupled to a first-third protrusion 214*p*3 and a first-fourth protrusion 214*p*3 of the first guide part 210 and a second-fourth protrusion (not shown) of the second guide part 220.

The fourth-first regular hole 21*ha*1 and the fourth-second regular hole 21*ha*2 may be circular holes, and the fourth-first long hole 21*hb*1 and the fourth-second long hole 21*hb*2 may have different diameters in a first axis direction and a second axis direction perpendicular thereto. The fourth-first regular hole 21*ha*1 and the fourth-second regular hole 21*ha*2 may be disposed diagonally. In this case, the fourth-first long hole 21*hb*1 and the fourth-second long hole 21*hb*2 may be disposed diagonally. However, the embodiment is not limited thereto, the fourth-first regular hole 21*ha*1 and the fourth-second regular hole 21*ha*2 may be disposed above the first region 21cA, and the fourth-first long hole 21hb1 and the fourth-second long hole 21hb2 may be disposed below the first region 21cA.

<Eccentric Features>

Next, FIG. 13 is an illustrative view showing a combination of the third lens assembly 130 and the first guide part 210 in the camera module according to the embodiment shown in FIG. 3, FIG. 14 is an enlarged view showing a correspondence between a plane and a cross section of a third regular hole 22hb, which is a coupling region of the third lens assembly 130 shown in FIG. 13, and FIG. 15 a cross-sectional example view showing a combination of the third lens assembly 130 and the first guide part 210 shown in FIG. 13.

Specifically, in FIG. 13, a region in which the first-second protrusion 214p2 of the first guide part 210 and the third regular hole 22ha of the third housing are coupled is indicated by a first region 214PH, and FIG. 15 is a cross-sectional view of a state in which they are coupled.

FIG. 14B is a cross-sectional view taken along line A1-A2 in FIG. 14A.

Referring to FIG. 14, the third regular hole 22ha of the third housing 21 may include a third groove 22hr and a third hole 22ht disposed in the third groove 22hr.

In the embodiment, a center 22hrc of the third groove and a center 22htc of the third hole do not coincide with each other and may be eccentric.

According to the embodiment, the center 22hrc of the third groove and the center 22htc of the third hole do not coincide, are spaced apart from each other, and are eccentrically disposed in the third regular hole 22ha of the third housing 21 in order to increase the accuracy of lens alignment between a plurality of lens groups, and thus there is a technical effect that decenter and lens tilt may be minimized during zooming by increasing the accuracy of alignment between the lens groups.

Next, referring to FIG. 15, there is a cross-sectional view taken along line A1-A2 of the first region 214PH in which the first-second protrusion 214p2 of the first guide part 210 and the third regular hole 22ha of a third housing are coupled.

In the embodiment, the first-second protrusion 214p2 may protrude from the first guide part 210, and a first-second recess 214r2 in a circular shape may be disposed around the first-second protrusion 214p2.

According to the embodiment, a center 214p2c of the first-second protrusion may not coincide with a center of the first-second recess or the center 22hrc of the third groove.

According to the embodiment, a center of a protrusion of the first guide part 210 and a center of a groove of the third housing do not coincide, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

FIG. 16 is an illustrative view showing a combination of a base 20 and a first guide part 210 of the camera module according to the embodiment shown in FIG. 3, and FIG. 17 is a cross-sectional example view showing a combination of a first regular hole 210ha and a first base protrusion 22p1 of the first guide part 210 shown in FIG. 16.

FIG. 18 a cross-sectional view showing a combination of the base 20 and the first guide part 210 shown in FIG. 16.

Specifically, in FIG. 16, a region in which the first base protrusion 22p1 of the base 20 and the first regular hole 210ha the first guide part are coupled is indicated by a second region 22PH, and FIG. 18 is a cross-sectional view of a state in which they are coupled.

FIG. 17B is a cross-sectional view taken along line A1-A2 in FIG. 17A.

Referring to FIG. 17, the first regular hole 210ha of the first guide part 210 may include a first groove 210hr and a first hole 210ht disposed in the first groove 210hr.

In the embodiment, a center 210hrc of the first groove and a center 210htc of the first hole do not coincide with each other and may be eccentric.

According to the embodiment, a center of the first groove 210hr and centers of grooves of the first and second guide parts do not coincide, are spaced apart from each other, and are eccentrically disposed in the first regular hole 210ha of the first guide part 210 in order to increase the accuracy of lens alignment between a plurality of lens groups, and thus there is a technical effect that decenter and lens tilt may be minimized during zooming by increasing the accuracy of alignment between the lens group.

Next, referring to FIG. 18, there is a cross-sectional view along line A3-A4 of the second region 22PH in which the first base protrusion 22p1 of the base 20 and the first regular hole 210ha of the first guide part are coupled.

In the embodiment, the first base protrusion 22p1 may protrude from the base 20, and a first base recess 20r in a circular shape may be disposed around the first base protrusion 22p1.

According to the embodiment, a center 22p1c of the first base protrusion may not coincide with a center of the first base recess or the center 210htc of the first groove.

According to the embodiment, a center of a protrusion of the base and centers of grooves of the first and second guide parts do not coincide with each other, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

Referring again to FIG. 12, as described above, a third side wall 21c of the base may include the fourth-first regular hole 21ha1, the fourth-second regular hole 21ha, the fourth-first long hole 21hb1, and the fourth-second long hole 21hb2. The base hole may be coupled to the first-third protrusion 214p3 and the first-fourth protrusion 214p4 of the first guide part 210, and the second-fourth protrusion (not shown) of the second guide part 220.

At this time, in the embodiment, the fourth-first regular hole 21ha1, the fourth-second regular hole 21ha may include a fourth-first groove (not shown) or a fourth-second groove (not shown), respectively.

At this time, in the embodiment, a center of the fourth-first groove and a center of the fourth-second groove do not coincide with a center of the fourth-first regular hole and a center of fourth-second regular hole, respectively, and may be eccentric.

According to the embodiment, the center of the fourth-first groove and the center of the fourth-second groove do not coincide with the center of the fourth-first regular hole and the center of fourth-second regular hole, respectively, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

In addition, according to the embodiment, a center of the first-third protrusion 214p3 of the first guide part 210 and a center of the second-fourth protrusion (not shown) of the second guide part 220 do not coincide with the center of the fourth-first groove and the center of the fourth-second groove, respectively.

According to the embodiment, the center of the first-third protrusion 214p3 of the first guide part 210 and the center of the second-fourth protrusion (not shown) of the second guide part 220 do not coincide with the center of the fourth-first groove and the center of the fourth-second groove, respectively, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

<Circuit Board>

FIG. 19A is a perspective view in which a part of a configuration of the camera module according to the embodiment shown in FIG. 1 is omitted, FIGS. 19B and 19C is a perspective view of the circuit board of the embodiment shown in FIG. 1, and FIG. 19d is an exploded perspective view of the circuit board of the embodiment shown in FIG. 1.

Referring to FIGS. 19A to 19D, the camera module 100 according to the embodiment may include a circuit board 40. The circuit board 40 may include a fourth circuit board 41, a second circuit board 42, a third circuit board 43, and a first circuit board 44.

The second circuit board 42 is electrically connected to the fourth circuit board 41, and a gyro sensor 51 for detecting motion and a first electronic device 52 may be disposed thereon. The first electronic device 52 may be an EEPROM, but is not limited thereto.

The third circuit board 43 may be electrically connected to a driving part driving the lens unit, and a second electronic device 53 driving the driving part may be disposed. The second electronic device 53 may be a driving circuit device (driver IC). Here, the driving circuit device may include a coil driver.

The second electronic device 53 may be a driving device in which a hall sensor and a coil driver are integrated. The second electronic device 53 may be a driving device in which a temperature sensor and a coil driver are integrated. The second electronic device 53 may be a driving device in which a Hall sensor, a temperature sensor, and a coil driver are integrated.

An image sensor unit 90 may be disposed on the first circuit board 44.

In an embodiment, the image sensor unit 90 may be disposed perpendicular to an optical axis direction of a parallel light. The image sensor unit may include a solid-state imaging device disposed on a predetermined first circuit board 44. For example, the image sensor unit 90 may include a charge coupled device (CCD) image sensor or a complementary metal-oxide-semiconductor (CMOS) image sensor.

Meanwhile, the circuit board 40 may include a first connection substrate 41C and a second connection substrate 42C.

The fourth circuit board 41 and the second circuit board 42 may be electrically connected to each other by a first connection board 41c, and the second circuit board 42 and the first circuit board 44 are connected to the second It may be electrically connected by the connection substrate 42c.

In the embodiment, the circuit board 40 may include any board having a wiring pattern that can be electrically connected, such as a rigid printed circuit board (Rigid PCB), a flexible printed circuit board (Flexible PCB), a rigid flexible printed circuit board (Rigid Flexible PCB).

For example, the first to fourth circuit boards 44, 42, 43, and 41 may be a rigid printed circuit board or a flexible printed circuit board, and the first and second connection substrates 41c and 42c may be a flexible printed circuit board (Flexible PCB) or a rigid flexible printed circuit board (Rigid Flexible PCB), but are not limited thereto.

The camera module according to the embodiment may implement OIS technology for correcting image quality by detecting movement by employing the gyro sensor 51 and correcting an optical path by moving a lens.

The movement of the camera module may include a linear movement that largely moves along an axis and a rotational movement that rotates about the axis.

First, the linear movement may include a movement in a horizontal coordinate axis (x-axis) direction of the camera module, a movement in a vertical coordinate axis (y-axis) direction of the camera module, and an optical axis (z-axis) direction movement arranged in front and rear direction of the camera module.

Next, the rotational movement may include a pitch indicating a vertical rotational movement with the horizontal coordinate axis (x-axis) as the rotational axis, a yaw indicating a rotational movement in left-right directions using the vertical coordinate axis (y-axis) as the rotational axis, and a roll indicating a rotational movement about the optical axis (z-axis) passing in the front-rear direction as the rotational axis.

In the embodiment, the gyro sensor 51 may employ a two-axis gyro sensor that detects two rotational motion amounts of pitch and yaw, which represent large motions in a two-dimensional image frame, or a 3-axis gyro sensor that detects the amount of movement of pitch, yaw, and roll may be employed for more accurate handshake correction. The motions corresponding to the pitch, yaw, and roll detected by the gyro sensor 51 may be converted into an appropriate physical quantity according to a hand shake correction method and a correction direction.

In an embodiment, the fourth circuit board 41 may be disposed to extend in a horizontal coordinate axis (x-axis) direction of the camera module, and the second circuit board 42 may be disposed in a y-axis direction perpendicular to the horizontal coordinate axis (x-axis) direction. In this case, the second circuit board 42 may be disposed to extend in a direction horizontal to the optical axis (z-axis) direction.

Through this, according to the embodiment, since the gyro sensor 51 is disposed on the second circuit board 42, there is a technical effect of realizing a miniature camera module.

For example, as the length of the circuit board 40 occupies about 15 mm in the horizontal coordinate axis (x-axis) direction of the camera module in the undisclosed internal technology, there was a limit to implementing the micro-camera module.

According to the embodiment, the gyro sensor 51 is disposed on the second circuit board 42 which is disposed to extend in a direction horizontal to the optical axis (z-axis) while being perpendicular to the horizontal coordinate axis (x-axis) direction. Accordingly, the central axis of the gyro sensor 51 may be horizontal to the horizontal coordinate axis (x-axis) direction, but may be perpendicular to the optical axis (z-axis) direction.

The second circuit board 42 may be disposed to extend in a vertical axis direction in a horizontal coordinate plane perpendicular to the optical axis.

Accordingly, in the embodiment, in the measurement data of the gyro sensor 51, the pitch movement is replaced with the roll, and the roll movement can be controlled by replacing the pitch, but is not limited thereto.

Alternatively, in designing the measurement data of the gyro sensor 51, the pitch movement may be set to the pitch, and the roll movement may be set to the roll.

On the other hand, in the prior art, as the gyro sensor is disposed to be spaced apart from the lens unit, there is a technical problem in that an error occurs between the degree of movement of the lens unit and the degree of movement detected by the gyro sensor according to the movement of the user. For example, when the camera module is rotated around the gyro sensor, the difference between the degree of movement of the gyro sensor and the degree of movement of the lens unit becomes large, so that the precision of the angular acceleration data is deteriorated.

However, in the embodiment, as the gyro sensor 51 is closely disposed on a side surface of the housing 120 on which the lens unit is disposed, the error of the degree of movement of the lens unit according to the user's movement and movement information sensed by the gyro sensor are significantly reduced. There is a special technical effect that can greatly improve the precision of the angular acceleration of the gyro sensor.

Meanwhile, the camera module may include a first circuit board 44 on which the image sensor 90 is disposed, a base 20 disposed on the first circuit board 44, a lens assembly 110, 120 disposed in the base 20, a second circuit board 42 on which the gyro sensor 51 is disposed while being disposed on a first sidewall 22a of the base 20, and a third circuit board 43 for driving the lens assembly.

For example, the base 20 may include a first sidewall 21a, a second sidewall 21b, a third sidewall 21c, and a fourth sidewall 21d, and the base 20 may include a plurality of sidewalls, an upper surface 21e of the base, and a lower surface 21f of the base.

For example, the base 20 may include a first sidewall 21a and a second sidewall 21b corresponding to the first sidewall 21a. For example, the second sidewall 21b may be disposed in a direction facing the first sidewall 21a.

In this case, the first sidewall 21a of the base 20 includes one end at which the second circuit board 42 is disposed and the other end at which the first region 43a of the third circuit board is disposed. And, a step may be formed at these ends.

Meanwhile, the third circuit board 43 may include a first region 43a disposed on the first sidewall 21a of the base 20 and in which a first coil part 141b for driving the lens assembly is disposed.

Also, the first coil part 141b may overlap the second circuit board 42 in a direction perpendicular to the optical axis direction.

The circuit board 43 may include a second region 43b disposed on the second sidewall 21b of the base 20 and in which a second coil part 142b for driving the lens assembly is disposed.

In addition, in the third circuit board 43, a first driving device 53a for controlling driving of the first coil part 141b together with the first coil part 141b is disposed on the first region 43a. The first driving device 53a may sense the position of the first lens assembly 110 moving by the electromagnetic force generated by the first coil part 141b. Also, the first driving device 530a may control the current applied to the first coil part 141b based on the sensed position of the first lens assembly 110. Here, the control of the current may include the strength of the current, the amplitude of the current, the direction of the current flow, and the like. Also, the first driving device 53a may sense a temperature around the first coil part 141b. In addition, the first driving device 53a may control the current applied to the first coil part 141b based on the ambient temperature of the first coil part 141b.

The first driving device 53a may be a driving circuit device (Driver IC) corresponding to a coil driver. The first driving device 53a may be configured by integrating a hall sensor and a coil driver. The first driving device 53a may be configured by integrating a temperature sensor and a coil driver. The first driving device 53a may be configured by integrating a Hall sensor, a temperature sensor, and a coil driver.

In addition, in the third circuit board 43, a second driving device 53b for controlling driving of the first coil part 142b together with the second coil part 142b is disposed on the second region 43b. The second driving device 53b may sense the position of the second lens assembly 120 moving by the electromagnetic force generated by the second coil part 142b. Also, the second driving device 53b may control the current applied to the second coil part 142b based on the sensed position of the second lens assembly 120. Here, the control of the current may include the strength of the current, the amplitude of the current, the direction of the current flow, and the like. Also, the second driving device 53b may sense a temperature around the second coil part 142b. In addition, the second driving device 53b may control the current applied to the second coil part 142b based on the ambient temperature of the second coil part 142b.

The second driving device 53b may be a driving circuit device (Driver IC) corresponding to a coil driver. The second driving device 53b may be configured by integrating a hall sensor and a coil driver. The second driving device 53b may be configured by integrating a temperature sensor and a coil driver. The second driving device 53b may be configured by integrating a Hall sensor, a temperature sensor, and a coil driver.

Also, the first coil part 141b and the second coil part 142b may overlap the second circuit board 42 in a direction perpendicular to the optical axis direction.

That is, in the related art, the Hall sensor is only disposed on the third circuit board 43 together with the first coil part 141b and the second coil part 142b. And in the conventional camera module, a coil driver for driving the first coil part 141b and second coil part 142b is disposed together with the image sensor unit 90 on a first circuit board 44 separate from the substrate on which the Hall sensor is disposed. Accordingly, in the related art, the number of connection pads connecting between the third circuit board 43 and the first circuit board 44 has increased. That is, the conventional camera module requires a signal line for electrically connecting the coil driver disposed on the first circuit board 44 and the Hall sensor disposed on the third circuit board 43 to each other. Accordingly, in the conventional camera module, the number of a plurality of connection pads soldered to connect the first circuit board 44 and the third circuit board 43 to each other has increased.

On the contrary, in the embodiment, a driving device in which the Hall sensor and the coil driver are integrated is disposed on the third circuit board 43. Accordingly, in the embodiment, among the connection pads connecting the third circuit board 43 and the first circuit board 44, the connection pad corresponding to the signal line between the conventional coil driver and the Hall sensor may be deleted.

In addition, the connection pad may act as a factor of heat generation, and as the number of connection pads increases, the heat generation value increases. In this case, in the embodiment, heat generation can be minimized by reducing the number of the connection pads, and various operational reliability problems that may be caused by the heat generation can be solved.

Meanwhile, when the coil driver and the Hall sensor are configured as separate devices as in the prior art, power is supplied to each element, and for this purpose, four capacitors for filtering AC power are required.

Specifically, in the prior art, a single common coil driver and two separate Hall sensors for controlling the coil parts of the first lens assembly and the second lens assembly in common were used. Accordingly, in one common coil driver, two capacitors connected to the external power input terminal and two capacitors connected to the ground from the internal power terminal were required. In contrast, in the embodiment, the size of the IC is miniaturized by separating one conventional common coil driver into two driving devices, and a Hall sensor is embedded in each driving device. Accordingly, in the embodiment, only one capacitor is provided for each of the two driving devices, and the number of capacitors can be reduced from four to two compared to the related art. As described above, in the embodiment, the number of capacitors can be remarkably reduced, thereby reducing component cost.

Also, in the related art, the image sensor unit 90 and the coil driver are disposed on the first circuit board 44, and accordingly, the first circuit board 44 has a multi-layered structure of six or more layers. On the other hand, in the embodiment, the coil driver disposed on the first circuit board 44 is removed, and accordingly, the number of layers of the first circuit board 44 can be reduced to four or less.

Also, in the related art, the coil driver and the Hall sensor are respectively disposed on different substrates. Accordingly, the coil driver and the Hall sensor were connected to each other through circuit wiring. At this time, as described above, the first circuit board 44 and the third circuit board 44 are spaced apart from each other by a predetermined interval, and accordingly, the circuit wiring also has a predetermined length. Also, as the length of the circuit wiring increases, a signal flowing through the circuit wiring is lost due to noise.

On the contrary, in the embodiment, a driving device in which the coil driver and the Hall sensor are integrated is disposed on the same substrate. More preferably, in the embodiment, position sensing and coil part control are performed by the first driving device 53a and the second driving device 53b in which the coil driver and the hall sensor are integrally formed with each other. Accordingly, in the embodiment, the length of the circuit wiring between the conventional coil driver and the Hall sensor can be minimized, and thus signal loss due to noise can be minimized.

Also, in the related art, the first circuit board 44 and the third circuit board 43 are connected through the connection pad, and accordingly, the coil driver and the coil part are connected to each other through the connection pad. At this time, solder for mutual adhesion of the substrate is disposed on the connection pad, and thus, in the related art, a loss occurred in the current applied to the coil part due to the contact resistance of the solder.

On the contrary, in the embodiment, the driving device and the coil part are disposed adjacent to each other on the same substrate. Accordingly, in the embodiment, it is possible to remove the contact resistance of the solder existing in the signal line between the conventional coil driver and the Hall sensor, and accordingly, the current loss can be minimized.

As described above, in the embodiment, the first coil part 141b and the second coil part 142b are respectively disposed on the first and second regions 53a and 53b facing each other of the third circuit board 43. In addition, a first driving device 53a for driving of the first coil part 141b is disposed in an inner region of the first coil part 141b. In this case, the first driving device 53a has a Hall sensor. In other words, the first driving device 53a is a device in which the Hall sensor and the coil driver are integrated. In addition, a second driving device 53b for driving of the second coil part 142b is disposed in the inner region of the second coil part 142b. In this case, the second driving device 53b has a Hall sensor. In other words, the second driving device 53b is a device in which the Hall sensor and the coil driver are integrated.

In addition, the image sensor unit 90 is disposed on the first circuit board 44 physically separated from the third circuit board 43.

Also, the circuit board 40 may include a fourth circuit board 41 connected to the second circuit board 42 and on which the connector 41b is disposed.

Meanwhile, in the embodiment, the first circuit board 44, the second circuit board 42, and the fourth circuit board 44 are illustrated as separate components, but the present invention is not limited thereto, it may be a sing substrate integrally formed with each other. However, the third circuit board 43 may be disposed as a separate configuration while being physically separated from the first circuit board 44, the second circuit board 42, and the fourth circuit board 44, and the third circuit board 43 may be a flexible circuit board.

Meanwhile, the positional accuracy of the first lens assembly 110 and the second lens assembly 120 is affected by the internal temperature of the camera module. That is, the error rate of the positional accuracy (eg, focusing accuracy) of the first lens assembly 110 and the second lens assembly 120 is increased under the influence of the internal temperature of the camera module.

Therefore, recent camera modules have a built-in temperature sensor, and a temperature compensation algorithm for compensating for currents applied to the first coil part 141b and the second coil part 142b according to the internal temperature of the camera module is provided.

At this time, in the conventional camera module, a temperature sensor is disposed on the first circuit board 44 together with a coil driver. However, the main cause of heat generation of the camera module is in the first coil part 141b and the second coil part 142b. That is, conventionally, a temperature compensation algorithm is provided by measuring the temperature around the image sensor unit or the coil driver, not the temperature around the coil, which is the main cause of heat generation. Due to this, there is a problem in that the accuracy of the conventional temperature compensation algorithm decreases.

In contrast, in the embodiment, a temperature sensor is disposed on the third circuit board 43 around the first driving device 53a and the second driving device 53b. Preferably, the camera module may include a first temperature sensor disposed together with the first driving device 53a in an inner region of the first coil part 141b. In addition, the camera module may include a second temperature sensor disposed together with the second driving device 53b in the inner region of the second coil part 142b. In this case, the first temperature sensor and the second temperature sensor may be built in the first driving device 53a and the second driving device 53a. In other words, each of the first driving device 53*a* and the second driving device 53*b* may be configured by integrating a coil driver, a temperature sensor, and a Hall sensor. Accordingly, in the embodiment, a temperature sensor is disposed around the coil part, which is the main heating factor of the camera module, and a temperature compensation algorithm is performed on the first driving device 53*a* and the second driving device 53*b* based on this. This can improve the temperature compensation accuracy. More preferably, the first driving device 53*a* may be a device having a built-in temperature sensor together with a coil driver and the Hall sensor. In other words, the first driving device 53*a* may be configured by integrating a Hall sensor, a temperature sensor, and a coil driver. In other words, the second driving device 53*b* may be configured by integrating a Hall sensor, a temperature sensor, and a coil driver.

FIG. 19E is a diagram for explaining a temperature compensation operation of a camera module;

Referring to FIG. 19E, the focusing target (code) of the camera module has the highest accuracy at ordinary temperature (eg, 20° C.). At this time, it can be confirmed that the focusing target decreases than the actual target as the temperature decreases from the ordinary temperature before the temperature compensation algorithm is applied, and it was confirmed that the focusing target increased than the actual target as the temperature increased.

On the other hand, as the temperature compensation algorithm was applied, it was confirmed that the focusing target and the actual target were within the error range within the entire temperature range regardless of the temperature.

However, in the related art, even when the temperature compensation algorithm is applied, there is a difference between the focusing target and the actual target. In contrast, in the embodiment, as described above, the difference between the focusing target and the actual target may be minimized by using the driving device having a built-in temperature sensor.

<Camera Module Coupled to OIS Actuator>

Next, FIG. 20 is a perspective view showing a camera module 1000A to which an OIS actuator 300 is coupled.

The camera module 1000A according to an embodiment may include a single or a plurality of camera actuators. For example, the camera module 1000A according to the embodiment may include a first camera actuator 100 and a second camera actuator 300.

The first camera actuator 100 supports one or a plurality of lenses, and may perform an autofocus function or a zoom function by moving a lens vertically according to a control signal of a predetermined control unit. In addition, the second camera actuator 300 may be an optical image stabilizer (OIS) actuator, but the embodiment is not limited thereto.

Hereinafter, the OIS actuator which is the second camera actuator 300 will be mainly described.

Next, FIG. 21A is a perspective view of the second camera actuator 300 in the camera module 1000A of the embodiment shown in FIG. 20 in a first direction, and FIG. 21B is a perspective view of the second camera actuator 300 in the camera module 1000A of the embodiment shown in FIG. 20 in a second direction.

Referring to FIGS. 21A and 21B, the second camera actuator 300 of the embodiment may include a housing 310, an image shaking control unit 320 disposed on the housing 310, a prism unit 330 disposed on the image shaking control unit 320, and a second driving part 72C (see FIG. 22A) electrically connected to a second circuit board 350.

Accordingly, according to the embodiment, the image shaking control unit 320 is provided, which is disposed on the housing 310, and thus there is a technical effect that it is possible to provide an ultra-thin and ultra-small camera actuator and a camera module including the same.

In addition, according to the embodiment, the image shaking control unit 320 is disposed below the prism unit 330, and thus there is a technical effect that when the OIS is implemented, lens size limitation of an optical system lens assembly may be eliminated, and a sufficient amount of light may be secured.

In addition, according to the embodiment, the image shaking control unit 320 stably disposed on the housing 310 is provided, and a shaper unit 322 and a first driving part 72M of FIG. 23A described later are included, and thus there is a technical effect that when the OIS is implemented through a lens unit 322*c* including a tunable prism 322*cp*, occurrence of a decenter or tilt phenomenon may be minimized to achieve the best optical characteristics.

Further, according to the embodiment, when the OIS is implemented, the first driving part 72M, which is a magnet driving part, is disposed on the second camera actuator 300 separated from the first camera actuator 100, and thus there is a technical effect that a magnetic field interference with an AF or Zoom magnet of the first camera actuator 100 may be prevented.

Furthermore, according to the embodiment, unlike the conventional method of moving a plurality of solid lenses, the OIS is implemented by including the lens unit 322*c* including the tunable prism 322*cp*, the shaper unit 322, and the first driving part 72M, and thus there is a technical effect that the OIS may be implemented with low power consumption.

Hereinafter, the second camera actuator 300 of the embodiment will be described in more detail with reference to the drawings.

FIG. 22A is a perspective view of an OIS circuit board 350 and the second driving part 72C of the second camera actuator 300 of the embodiment shown in FIG. 21B, and FIG. 22B is a partially exploded perspective view of the second camera actuator 300 of the embodiment shown in FIG. 21B, and FIG. 22C is a perspective view in which the OIS circuit board 350 is removed from the second camera actuator 300 of the embodiment shown in FIG. 21B.

First, referring to FIG. 22A, the OIS circuit board 350 may be connected to a predetermined power supply (not shown) to apply power to the second driving part 72C. The OIS circuit board 350 may include a circuit board having a wiring pattern that may be electrically connected, such as a rigid printed circuit board (Rigid PCB), a flexible printed circuit board (Flexible PCB), and a rigid flexible printed circuit board (Rigid Flexible PCB).

The second driving part 72C may include a single or a plurality of unit driving parts, and may include a plurality of coils. For example, the second driving part 72C may include a fifth unit driving part 72C1, a sixth unit driving part 72C2, a seventh unit driving part 72C3, and an eighth unit driving part (not shown).

In addition, the second driving part 72C may further include a hall sensor (not shown) to recognize a position of a first driving part 72M (see FIG. 21B) described later. For example, the fifth unit driving part 72C1 may further include a first hall sensor (not shown), and the seventh unit driving part 72C3 may further include a second hall sensor (not shown). On the other hand, as described above with FIG. 19, the coil driver and the hall sensor provided in the second camera actuator 300 for OIS are also integrally configured and may be disposed in the coil constituting the driving part.

According to the embodiment, the image shaking control unit 320 stably disposed on the housing 310 is provided, and the OIS is implemented through the second driving part 72C which is a coil driving part, the first driving part 72M which is a magnet driving part, and the lens unit 322c including a tunable prism, and thus occurrence of a decenter or tilt phenomenon may be minimized to achieve the best optical characteristics.

In addition, according to the embodiment, unlike the conventional method of moving a plurality of solid lenses, the OIS is implemented by driving the shaper unit 322 through the lens unit 322c including the tunable prism, the first driving part 72M which is a magnet driving part, and the second driving part 72C which is a coil driving part, and thus there is a technical effect that the OIS may be implemented with low power consumption.

Next, referring to FIG. 22B and FIG. 22C, the second camera actuator 300 of the embodiment may include the housing 310, the image shaking control unit 320 including the shaper unit 322 and the first driving part 72M and disposed on the housing 310, the second driving part 72C disposed on the housing 310, and a prism unit 3230 disposed on the image shaking control unit 320 and including a fixed prism 332.

Referring to FIG. 22B, the housing 310 may include a predetermined opening 312H through which light may pass at a housing body 312, and may include a housing side portion 314P extending above the housing body 312 and including a driving part hole 314H in which the second driving part 72C is disposed.

For example, the housing 310 may include a first housing side portion 314P1 extending above the housing body 312 and including a first driving part hole 314H1 in which the second driving part 72C is disposed, and a second housing side portion 314P2 including a second driving part hole 314H2 in which the second driving part 72C is disposed.

According to the embodiment, the second driving part 72C is disposed on the housing side portion 314P, and the OIS is implemented by driving the shaper unit 322 and the lens unit 322c including the tunable prism through the first driving part 72M, which is a magnet driving part, and an electromagnetic force, and thus the OIS may be implemented with low power consumption.

In addition, according to the embodiment, the OIS is implemented by controlling the lens unit 322c including a tunable prism through the second driving part 72C stably fixed on the housing side portion 314P and the first driving part 72M which is a magnet driving part, and thus occurrence of a decenter or tilt phenomenon may be minimized to achieve the best optical characteristics.

Next, the fixed prism 332 may be a right-angle prism, and may be disposed inside the first driving part 72M of the image shaking control unit 320. In addition, in the embodiment, a predetermined prism cover 334 is disposed above the fixed prism 332 so that the fixed prism 332 may be tightly coupled to the housing 310, and thus there is a technical effect that prism tilt and occurrence of decenter at the second camera actuator 300 may be prevented.

In addition, according to the embodiment, the image shaking control unit 320 is disposed so as to utilize a space below the prism unit 330 and overlap each other, and thus there is a technical effect that it is possible to provide an ultra-thin and ultra-small camera actuator and a camera module including the same.

Specifically, according to the embodiment, the prism unit 330 and the lens unit 322c including the tunable prism may be disposed very close to each other, and thus there is a special technical effect that even though a change in an optical path is made fine in the lens unit 322c, the change in the optical path may be widely secured in the actual image sensor unit.

For example, referring briefly to FIG. 26B, a second moving path L1a of light beam changed by the fixed prism 332 may be changed by the tunable prism 322cp to be changed to a third moving path L1b.

At this time, according to the embodiment, the fixed prism 332 and the lens unit 322c including the tunable prism may be disposed very close to each other, and a distance between the lens unit 322c and an image plane 190P of the first lens assembly (not shown) may be secured to be relatively long.

Accordingly, a first distance D1δ reflected on the image plane 190P may be secured widely according to a change in an inclination of a predetermined angle ⊖ in the tunable prism 322cp, and thus there is a special technical effect that even though the change in the optical path is made fine in the lens unit 322c, the change in the optical path may be widely secured in the actual image sensor unit.

Next, FIG. 23A is an exploded perspective view of the image shaking control unit 320 of the second camera actuator 300 of the embodiment shown in FIG. 22B, and FIG. 23B is a combined perspective view of the image shaking control unit 320 of the second camera actuator of the embodiment shown in FIG. 23A, and FIG. 23C is an exploded perspective view of the first driving part 72M of the image shaking control unit 320 shown in FIG. 23A.

Referring to FIGS. 23A and 23B, in the embodiment, the image shaking control unit 320 may include the shaper unit 322 and the first driving part 72M.

The shaper unit 322 may include a shaper body 322a including a hole through which light may pass, and a protruding portion 322b extending from the shaper body 322a to a side surface thereof and coupled to the first driving part 72M in a first vertical direction.

In addition, the shaper unit 322 may include a lens unit 322c disposed on the shaper body 322a in a second vertical direction opposite to the first vertical direction and including a tunable prism.

Accordingly, according to the embodiment, OIS is implemented through the image shaking control unit 320 including the shaper unit 322 and the first driving part 72M, and the lens unit 322c including the tunable prism, and thus there is a technical effect that occurrence of a decenter or tilt phenomenon may be minimized to achieve the best optical characteristics.

Specifically, referring to FIGS. 23A and 23B, the first driving part 72M may include a single or a plurality of magnet frames 72MH1 and 72MH2 coupled to the protruding portion 322b, and a unit driving part disposed on the magnet frames 72MH1 and 72MH2.

For example, the first driving part 72M may include a first magnet frame 72MH1 and a second magnet frame 72MH2, and a first unit driving part 72M1 and a second unit driving part 72M2 may be disposed on the first magnet frame 72MH, and a third unit driving part 72M3 and a fourth unit driving part 72M4 may be disposed on the second magnet frame 72MH2.

Each of the first to fourth unit driving parts 72M1, 72M2, 72M3, and 72M4 may include first to fourth magnets.

FIG. 23C is an exploded perspective view of the first driving part 72M of the image shaking control unit 320 shown in FIG. 23A.

In the embodiment, the first driving part 72M may block the interference of the magnetic field by further including yokes 72MY disposed on the first and second magnet frames 72MH1 and 72MH2.

For example, the first magnet frame 72MH1 of the first driving part 72M may include a frame groove 72MR, and the yoke 72MY may be disposed on the frame groove 72MR. Thereafter, the first unit driving part 72M1 and the second unit driving part 72M2 may be disposed on the yoke 72MY, respectively.

At this time, the yoke 72MY may include a yoke protruding portion 72MYP to be firmly coupled to the protruding portion 322b of the shaper unit 322.

Next, FIG. 24 is a perspective view of the shaper unit 322 of the second camera actuator of the embodiment shown in FIG. 23A.

Referring to FIG. 24, the shaper unit 322 may include a shaper body 322a including an opening through which light may pass, a protruding portion 322b extending from the shaper body 322a to a side surface thereof and coupled to the first driving part 72M in a first vertical direction, and a lens unit 322c disposed on the shaper body 322a in a second vertical direction opposite to the first vertical direction and including a tunable prism 322cp.

Specifically, in the embodiment, the shaper unit 322 may include a plurality of magnet support portions extending from the shaper body 322a to both sides thereof, respectively. For example, the shaper unit 322 may include a first protruding portion 322b1 and a second protruding portion 322b2 that are branched and extend from the shaper body 322a to a first side thereof, and a third protruding portion 322b3 and a fourth protruding portion 322b4 that are branched and extend to a second side thereof.

The first driving part 72M may include first to fourth unit driving parts 72M1, 72M2, 72M3, and 72M4 coupled to the first to fourth protruding portions 322b1, 322b2, 322b3, and 322b4, respectively.

Referring to FIG. 24, in the embodiment, the shaper unit 322 may include a coupling groove 322bh in the magnet support portion to be coupled to a magnet frame. Accordingly, the image shaking control unit 320 as shown in FIG. 23B may be coupled to the shaper unit 322.

According to the embodiment, in a state in which the first driving part 72M is firmly coupled to the shaper unit 322, OIS is implemented through an optical path control of the lens unit 322c including a tunable prism, and thus there is a special technical effect that occurrence of a decenter or tilt phenomenon may be minimized to achieve the best optical characteristics.

Next, FIG. 25 is a cross-sectional view of the lens unit 322c taken along line A1-A1' of the shaper unit 322 shown in FIG. 24.

Referring to FIG. 25, in the embodiment, the lens unit 322c may include a translucent support 322c2, a bracket 322cb disposed on the translucent support 322c2 with a predetermined accommodation space, a tunable prism 322cp or a liquid lens (not shown) disposed in the accommodation space of the bracket 322cb, a flexible plate 322cm disposed on the tunable prism 322cp or the liquid lens, and a second translucent support (not shown) disposed on the flexible plate 322cm. The flexible plate 322cm may be formed of a translucent material.

The translucent support 322c2 and the second translucent support (not shown) may be formed of a translucent material. For example, the translucent support 322c2 and the second translucent support may be formed of glass, but the embodiment is not limited thereto.

The translucent support 322c2 and the second translucent support may have a hollow circular ring shape or a square ring shape.

A size of the second translucent support (not shown) may be formed smaller than that of the accommodation space of the bracket 322cb.

The tunable prism 322cp may include an optical liquid disposed in a space created by the translucent support 322c2, the support bracket 322cb, and the flexible plate 322cm. Alternatively, the tunable prism 322cp may include a wedge prism.

In an embodiment, the tunable prism 322cp may be a lens made of a fluid, and the fluid lens may have a shape in which a liquid is surrounded by a fluid film, but the embodiment is not limited thereto.

In the embodiment, an optical liquid used by the tunable prism 322cp may be a transparent, low-fluorescent, non-toxic material. For example, the optical liquid of the embodiment may use a chlorofluorocarbon (CFC) component or the like, but the embodiment is not limited thereto.

The bracket 322cb may be formed of a stretchable material or a non-stretchable material. For example, the bracket 322cb may be formed of an elastic film material or a metal material, but the embodiment is not limited thereto.

When the flexible plate 322cm receives a predetermined force by the shaper body 322a according to movement of the first driving part 72M, as shown in FIG. 26B, a part of the flexible plate 322cm moves upward or downward due to characteristics of a flexible elastic material, and the form of the tunable prism 322cp may be variable.

For example, the flexible plate 322cm may be a reverse osmosis (RO) membrane, a nano filtration (NF) membrane, a ultra-filtration (UF) membrane, a micro filtration (MF) membrane, and the like, but the embodiment is not limited thereto. Here, the RO membrane may be a membrane having a pore size of about 1 to 15 angstroms, the NF membrane may be a membrane having a pore size of about 10 angstroms, the UF membrane may be a membrane having a pore size of about 15 to 200 angstroms, and the MF membrane may be a membrane having a pore size of about 200 to 1000 angstroms.

According to the embodiment, the image shaking control unit 320 stably disposed on the housing 310 is provided, and the shaper unit 322 and the first driving part 72M are included, and thus there is a technical effect that when the OIS is implemented through the lens unit 322c including the tunable prism 322cp, occurrence of a decenter or tilt phenomenon may be minimized to achieve the best optical characteristics.

Next, FIGS. 26A to 26B are illustrative views showing an operation of the second camera actuator 300 of the embodiment.

For example, FIG. 26A is an illustrative view before an operation of the OIS actuator of the embodiment, and FIG. 26B is an illustrative view after the operation of the OIS actuator of the embodiment.

In a broad sense, the prism in an embodiment may include a fixed prism 332 that changes a path of a predetermined light beam, and a tunable prism 322cp that is disposed below the fixed prism 332 and changes a path of a light beam emitted from the fixed prism 332.

Referring to FIGS. 26A and 26B, the second camera actuator 300 of the embodiment may change a form of the tunable prism 322cp through the first driving part 72M and the second driving part 72C to control the path of the light beam.

For example, in the embodiment, the second camera actuator 300 may control the path of the light beam by changing an apex angle ⊖ of the tunable prism 322*cp* through the first driving part 72M which is a magnet driving part.

For example, referring to FIG. 26A, an incident light L1 is changed to the second moving path L1*a* by the fixed prism 332, but the light path is not changed by the tunable prism 322*cp*.

On the other hand, referring to FIG. 26B, the second moving path L1*a* of the light beam changed by the fixed prism 332 may be changed in the tunable prism 322*cp* to be changed to the third moving path L1*b*.

For example, when the flexible plate 322*cm* receives a predetermined force by the shaper body 322*a* according to movement of the first driving part 72M, the second translucent support (not shown) receives the force, and the force is transmitted to the flexible plate 322*cm*, and a part of the flexible plate 322*cm* moves upward or downward due to characteristics of a flexible elastic material, and the form of the tunable prism 322*cp* may be variable.

For example, as a left upper end of the shaper body 322*a* receives a force F2 in a second direction by the first unit driving part 72M1, and a right upper end of the shaper body 322*a* receives a force F1 in a first direction by the second unit driving part 72M2, it may be varied. The second translucent support (not shown) receives a force according to movement of the shaper body 322*a*, and the flexible plate 322*cm* may be changed in an inclination of a predetermined angle ⊖ of by the force.

Hereinafter, with reference to FIG. 26B, in the embodiment, an image stabilizing device for controlling the path of the light beam will be described in further detail by deforming the shape of the tunable prism 322*cp* through the first driving part 72M.

First, according to the embodiment, due to occurrence of camera shake, an image needs to move to a side surface by a first distance D1δ on an image plane (not shown) of a lens assembly provided in the first camera actuator 100.

At this time, D1 is a distance from the tunable prism 322*cp* to the image plane of the lens assembly, δ is a chromatic aberration of the tunable prism 322*cp*, and ⊖ is an apex angle of the tunable prism 322*cp*.

That is, according to the embodiment, after calculating a changed apex angle ⊖ of the tunable prism 322*cp*, the path of the light beam may be controlled to the third moving path L1*b* by changing the apex angle ⊖ of the tunable prism 322*cp* through the first driving part 72M.

At this time, a relationship of δ=n−1X⊖ may be established between the chromatic aberration δ of the tunable prism 322*cp* and the apex angle ⊖ of the tunable prism 322*cp* (where n is a refractive index of the tunable prism 322*cp* with respect to a center wavelength of a band of interest).

According to the embodiment, the prism unit 330 and the lens unit 322*c* including the tunable prism may be disposed very close to each other, and thus there is a special technical effect that even though a change in an optical path is made fine in the lens unit 322*c*, the change in the optical path may be widely secured in the actual image sensor unit.

For example, according to the embodiment, the fixed prism 332 and the lens unit 322*c* including the tunable prism may be disposed very close to each other, and a distance between the lens unit 322*c* and an image plane 190P of the first lens assembly (not shown) may be secured to be relatively long. Accordingly, a first distance D1δ reflected on the image plane 190P may be secured widely according to a change in an inclination of a predetermined angle ⊖ in the tunable prism 322*cp*, and thus there is a special technical effect that even though the change in the optical path is made fine in the lens unit 322*c*, the change in the optical path may be widely secured in the actual image sensor unit.

Next, FIG. 27 is a first operation illustrative view of the second camera actuator of the embodiment.

For example, FIG. 27 is the first operation example view viewed from a z-axis direction of the second camera actuator 300 according to the embodiment shown in FIG. 21B.

Referring to FIG. 27, power is applied to the second driving part 72C through the second circuit board 350, and a current flows through each coil, and accordingly, an electromagnetic force may be generated between the second driving part 72C and the first driving part 72M in a first direction F1 or a second direction F2, and the flexible plate 322*cm* may be tilted at a predetermined angle by the first driving part 72M that is moved, thereby controlling the apex angle ⊖ of the tunable prism 322*cp*.

For example, referring to FIG. 27, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, when a current C1 in the first direction flows in the fifth unit driving part 72C1 and the sixth unit driving part 72C2, the force F2 may be applied in the second direction. On the other hand, when the current C1 in the first direction flows in the seventh unit driving part 72C3 and the eighth unit driving part 72C4, the force F1 may be applied in the first direction opposite to the second direction.

Accordingly, in the first unit driving part 72M1 and the second unit driving part 72M2, the force F2 may be applied to the flexible plate 322*cm* in the second direction, and in the third unit driving part 72M3 and the fourth unit driving part 72M4, the force F1 may be applied to the flexible plate 322*cm* in the first direction, and accordingly, the apex angle ⊖ of the tunable prism 322*cp* may be deformed at a first angle ⊖1 to change and control the light path.

Next, FIG. 28 is a second operation example view of the second camera actuator 300 of the embodiment.

For example, FIG. 28 is the second operation example view viewed from a z-axis direction of the second camera actuator 300 according to the embodiment shown in FIG. 21B.

For example, power is applied to the second driving part 72C, and a current flows through each coil, and accordingly, an electromagnetic force may be generated between the second driving part 72C and the first driving part 72M in a first direction F1 or a second direction F2, and the flexible plate 322*cm* may be tilted at a predetermined angle.

For example, referring to FIG. 28, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, a current C1 in the first direction may flow in the fifth unit driving part 72C1 and the seventh unit driving part 72C3, and a current C2 in the second direction may flow in the sixth unit driving part 72C2 and the eighth unit driving part 72C4.

Accordingly, the force F2 may be applied in the second direction in the first unit driving part 72M1 and the fourth unit driving part 72M4, and the force F1 may be applied in the first direction in the second unit driving part 72M2 and the third unit driving part 72M3.

Accordingly, in the first unit driving part 72M1 and the fourth unit driving part 72M4, the force F2 may be applied to the flexible plate 322cm of the variable prism 322cp in the second direction, and in the second unit driving part 72M2 and the third unit driving part 72M3, the force F1 may be applied to the flexible plate 322cm of the variable prism 322cp in the first direction, and accordingly, the apex angle ⊖ of the tunable prism 322cp may be deformed at a second angle ⊖2 to change and control the light path.

According to the embodiment, the image shaking control unit 320 is disposed so as to utilize a space below the prism unit 330 and overlap each other, and thus there is a technical effect that it is possible to provide an ultra-thin and ultra-small camera actuator and a camera module including the same.

In addition, according to the embodiment, the image shaking control unit 320 is disposed below the prism unit 330, and thus there is a technical effect that when the OIS is implemented, lens size limitation of an optical system lens assembly may be eliminated, and a sufficient amount of light may be secured.

In addition, according to the embodiment, the image shaking control unit 320 stably disposed on the housing 310 is provided, and a shaper unit 322 and a first driving part 72M are included, and thus there is a technical effect that when the OIS is implemented through a lens unit 322c including a tunable prism 322cp, occurrence of a decenter or tilt phenomenon may be minimized to achieve the best optical characteristics.

Further, according to the embodiment, when the OIS is implemented, the first driving part 72M, which is a magnet driving part, is disposed on the second camera actuator 300 separated from the first camera actuator 100, and thus there is a technical effect that a magnetic field interference with an AF or Zoom magnet of the first camera actuator 100 may be prevented.

Next, FIG. 29 is another perspective view of a camera module 1000 according to another embodiment.

The camera module 1000 according to another embodiment may further include a second camera module 1000B in addition to the camera module 1000A described above. The second camera module 1000B may be a camera module of a fixed focal length lens. The fixed focal length lens may be referred to as a "single focal length lens" or a "single lens". The second camera module 1000B may be electrically connected to a third group of circuit boards 430. The second camera actuator 300 included in the camera module 1000A may be electrically connected to a second group of circuit boards 420.

Next, FIG. 30 shows a mobile terminal 1500 to which a camera module according to an embodiment is applied.

As shown in FIG. 30, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10 m or less or a dark environment. The autofocus device 1510 may include a light-emitting unit including a vertical cavity surface emitting laser (VCSEL) semiconductor device, and a light receiving unit that converts light energy into electric energy such as a photodiode.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the embodiments.

Embodiments are mostly described above, but they are only examples and do not limit the embodiments. A person skilled in the art to which the embodiments pertain may appreciate that several variations and applications not presented above may be made without departing from the essential characteristic of the embodiments. For example, each component particularly represented in the embodiments may be varied. In addition, it should be construed that differences related to such a variation and such an application are included in the scope of the embodiment defined in the following claims.

What is claimed is:

1. A camera module comprising:
   a base;
   a first lens assembly and a second lens assembly disposed in the base to be movable along an optical axis direction; and
   a first driving part that moves the first lens assembly along the optical axis direction,
   wherein the first driving part comprises:
   a first magnet;
   a first coil disposed to face the first magnet; and
   a first driving device disposed in an inner region of the first coil,
   wherein the first driving device comprises a first hall sensor configured to sense a movement of the first lens assembly and a first coil driver connected to the first coil,
   wherein the first coil driver is overlapped with the first coil in the optical axis direction, wherein the first lens assembly includes a first lens barrel and an extension portion extending parallel to the optical axis direction from the first lens barrel, wherein the extension portion includes:
a first region overlapping the first lens barrel in a first direction perpendicular to the optical axis direction; and
a second region non-overlapping with the first lens barrel in the first direction and overlapping the second lens assembly in the first direction, wherein at least a portion of the first magnet is disposed on the second region of the extension portion, and wherein the first magnet extends outward from the extension portion.

2. The camera module of claim 1, further comprising a circuit board including a first substrate portion on which an image sensor is disposed and a second substrate portion on which the first coil is disposed,
wherein the first driving device is disposed in the inner region of the first coil on the second substrate portion.

3. The camera module of claim 2, wherein the first coil driver has the first hall sensor and a temperature sensor embedded therein.

4. The camera module of claim 3, further comprising a ball disposed between the base and one surface of the first lens assembly,
wherein the one surface of the first lens assembly includes a first recess provided on one surface of the first region of the extension portion and a second recess provided on one surface of the second region of the extension portion and arranged to be spaced apart from the first recess in the optical axis direction, and
wherein the ball includes a first ball disposed in the first recess and a second ball disposed in the second recess.

5. The camera module of claim 4, wherein at least one of the first ball and the second ball overlaps the first magnet in a second direction perpendicular to the first direction and the optical axis direction.

6. The camera module of claim 4, wherein the second recess overlaps at least a portion of the first magnet in a second direction perpendicular to the first direction and the optical axis direction.

7. The camera module of claim 4, wherein the first magnet overlaps a region between the first recess and the second recess in a second direction perpendicular to the first direction and the optical axis direction.

8. The camera module of claim 4, wherein the one surface of the first lens assembly includes a third recess provided on the one surface of the first region of the extension portion and spaced apart from the first recess in a second direction perpendicular to the first direction and the optical axis direction.

9. The camera module of claim 8, wherein the one surface of the first lens assembly includes a fourth recess provided on the one surface of the second region of the extension portion and spaced apart from the second recess in the second direction.

10. The camera module of claim 4, wherein the first second lens assembly includes a second lens barrel overlapping the first lens barrel in the optical axis direction and non-overlapping with the first lens barrel in the first direction.

11. The camera module of claim 10, wherein the second recess overlaps the second lens assembly barrel in the first direction, and wherein the first recess does not overlap the second lens assembly and overlaps the first lens barrel in the first direction.

12. The camera module of claim 10, wherein the second ball overlaps the second lens assembly in the first direction, and
wherein the first ball does not overlap the second lens assembly and overlaps the first lens barrel in the first direction.

13. The camera module of claim 10, wherein the base includes a first guide part facing the first recess and the second recess and on which the ball is disposed.

14. The camera module of claim 13, wherein a length of the first guide part in the optical axis direction is greater than a minimum distance between the first recess and the second recess in the optical axis direction.

15. The camera module of claim 3, further comprising a third substrate portion disposed on one side of the base and on which a gyro sensor is disposed,
wherein the first coil overlaps the third substrate portion in the first direction.

16. The camera module of claim 1, wherein the second lens assembly includes an extension portion extending parallel to the optical axis direction and overlapping the first lens assembly in the first direction.

17. A camera module comprising:
a base;
a first lens assembly and a second lens assembly disposed in the base to be movable along an optical axis direction, the first lens assembly including a first groove and the second lens assembly including a second groove;
a prism that changes a path of light incident on the base to the optical axis direction;
a first driving part that moves the first lens assembly along the optical axis direction;
a second driving part that moves the second lens assembly along the optical axis direction;
a first ball disposed between the base and the first lens assembly; and
a second ball disposed between the base and the second lens assembly,
wherein the first driving part includes a first magnet disposed in the first groove of the first lens assembly, a first coil disposed to face the first magnet, and a first driving device disposed in an inner region of the first coil,
wherein the first driving device comprises a first hall sensor configured to sense a movement of the first lens assembly and a first coil driver connected to the first coil,
wherein the first coil driver is overlapped with the first coil in the optical axis direction,
wherein the second driving part includes a second magnet disposed in the second groove of the second lens assembly and a second coil disposed to face the second magnet,
wherein the first lens assembly includes a first lens barrel and a first extension portion extending parallel to the optical axis direction from the first lens barrel,
wherein the second lens assembly includes a second lens barrel and a second extension portion extending parallel to the optical axis direction from the second lens barrel,
wherein the first extension portion includes:
a first region overlapping the first lens barrel in a first direction perpendicular to the optical axis direction; and a second region non-overlapping with the first lens barrel in the first direction and overlapping the second lens assembly in the first direction, wherein the second extension portion includes:
- a third region overlapping the second lens barrel in the first direction; and
- a fourth region non-overlapping with the second lens barrel in the first direction, wherein at least a portion of the first magnet is disposed on the second region of the first extension portion, and wherein at least a portion of the second magnet is disposed on the fourth region of the second extension portion.

18. The camera module of claim 17, wherein the first lens assembly includes a first recess and a second recess arranged to be spaced apart in the optical axis direction, wherein the first ball includes a first-first ball disposed in the first recess and a first-second ball disposed in the second recess, wherein the second lens assembly includes a third recess and a fourth recess arranged to be spaced apart in the optical axis direction, and wherein the second ball includes a second-first ball disposed in the third recess and a second-second ball disposed in the fourth recess.

19. The camera module of claim 18, wherein the first-second ball is disposed on the second region of the first extension portion, and the first-first ball is disposed on the first region of the first extension portion, and wherein the second-second ball is disposed on the fourth region of the second extension portion, and the second-first ball is disposed on the third region of the second extension portion.

20. The camera module of claim 18, wherein, when the first and second lens assemblies are supported and driven by the first ball and the second ball, the first magnet and the second magnet overlap in the first direction.

* * * * *